US012295521B2

(12) United States Patent
Rijskamp et al.

(10) Patent No.: US 12,295,521 B2
(45) Date of Patent: May 13, 2025

(54) SYSTEM FOR PREPARING A BEVERAGE

(71) Applicant: KONINKLIJKE DOUWE EGBERTS B.V., Utrecht (NL)

(72) Inventors: Peter Rijskamp, Gaggio Montano (IT); Judith Margreet Haaneke Ogink, Putten (NL); Klaas Kooijker, Drachten (NL); Jarno Beekman, Drachten (NL)

(73) Assignee: KONINKLIJKE DOUWE EGBERTS B.V., Utrecht (NL)

( * ) Notice: Subject to any disclaimer, the term of this patent is extended or adjusted under 35 U.S.C. 154(b) by 177 days.

(21) Appl. No.: 16/265,950

(22) Filed: Feb. 1, 2019

(65) Prior Publication Data
US 2019/0167031 A1 Jun. 6, 2019

Related U.S. Application Data

(63) Continuation of application No. PCT/NL2017/050514, filed on Aug. 3, 2017.

(30) Foreign Application Priority Data

Aug. 3, 2016 (NL) ..................................... 2017282

(51) Int. Cl.
*A47J 31/36* (2006.01)
*A47J 31/06* (2006.01)
(Continued)

(52) U.S. Cl.
CPC ....... *A47J 31/3633* (2013.01); *A47J 31/0647* (2013.01); *A47J 31/3638* (2013.01); *A47J 31/407* (2013.01); *B65D 85/8043* (2013.01)

(58) Field of Classification Search
CPC ................ A47J 31/3633; A47J 31/0647; A47J 31/3638; A47J 31/407; A47J 31/0668;
(Continued)

(56) References Cited

U.S. PATENT DOCUMENTS

| 4,775,048 A | 10/1988 | Baecchi |
| 4,787,299 A | 11/1988 | Levi |
| (Continued) | | |

FOREIGN PATENT DOCUMENTS

| AU | 2013305155 | 3/2015 |
| CA | 2765324 | 11/2010 |
| (Continued) | | |

OTHER PUBLICATIONS

International Preliminary Report on Patentability, PCT/NL2017/050509, 7 pages (Feb. 5, 2019).
(Continued)

*Primary Examiner* — Eric S Stapleton
*Assistant Examiner* — Yeong Juen Thong
(74) *Attorney, Agent, or Firm* — Fitch, Even, Tabin & Flannery LLP

(57) ABSTRACT

Various aspects related to a system for preparing a quantity of beverage suitable for consumption. The system comprises a first exchangeable capsule and a second exchangeable capsule, the second exchangeable capsule being larger than the first exchangeable capsule and an apparatus including a first brew chamber part and a second brew chamber part forming a brew chamber for selectively holding one of the first and second exchangeable capsules, and a fluid dispensing device for supplying an amount of fluid, such as water, under pressure to the first brew chamber part. The cavity of the first brew chamber part provides guidance to an outer part of the second exchangeable capsule, ensuring proper positioning before commencing the process of preparing the beverage. Optionally, the first brew chamber part comprises a centering module for centering the second exchangeable capsule in the cavity.

16 Claims, 16 Drawing Sheets

(51) Int. Cl.
*A47J 31/40* (2006.01)
*B65D 85/804* (2006.01)

(58) Field of Classification Search
CPC .... A47J 31/4482; A47J 31/4403; A47J 31/36; A47J 31/3623; A47J 31/44; A47J 31/3628; A47J 31/545; B65D 85/8043; B65D 85/8064; B65D 85/8049; B65D 85/8052
USPC .......................... 99/279, 280, 285, 287, 295
See application file for complete search history.

(56) References Cited

U.S. PATENT DOCUMENTS

| | | | |
|---|---|---|---|
| 5,197,374 A | 3/1993 | Fond | |
| 5,964,142 A | 10/1999 | Tio | |
| 6,026,732 A | 2/2000 | Kollep | |
| 7,216,582 B2 | 5/2007 | Yoakim | |
| 7,337,704 B2 | 3/2008 | Hammad | |
| 7,607,385 B2 | 10/2009 | Halliday | |
| 8,210,096 B2 * | 7/2012 | Fin | A47J 31/3638 99/295 |
| 8,365,585 B2 | 2/2013 | Barra | |
| 8,770,095 B2 | 7/2014 | Pecci | |
| 8,836,956 B2 | 9/2014 | Jarisch | |
| 8,904,922 B2 | 12/2014 | Pagano | |
| 9,167,934 B2 | 10/2015 | Höglauer | |
| 9,439,532 B2 | 9/2016 | Crarer | |
| 9,801,494 B2 | 10/2017 | Castellani | |
| 9,986,869 B2 * | 6/2018 | Bonacci | A47J 31/0647 |
| 2001/0011502 A1 | 8/2001 | Bonanno | |
| 2002/0023543 A1 | 2/2002 | Schmed | |
| 2003/0066431 A1 | 4/2003 | Fanzutti | |
| 2004/0197444 A1 | 10/2004 | Halliday | |
| 2005/0223904 A1 | 10/2005 | Laigneau | |
| 2006/0075902 A1 | 4/2006 | Magno | |
| 2006/0107841 A1 | 5/2006 | Schifferle | |
| 2006/0266224 A1 | 11/2006 | Hammad | |
| 2008/0006159 A1 | 1/2008 | Fischer | |
| 2008/0245236 A1 | 10/2008 | Ternite | |
| 2010/0064899 A1 | 3/2010 | Aardenburg | |
| 2011/0000377 A1 | 1/2011 | Favre | |
| 2011/0142996 A1 | 6/2011 | Krueger | |
| 2011/0185910 A1 | 8/2011 | Ryser | |
| 2011/0297005 A1 | 12/2011 | Mariller | |
| 2012/0240779 A1 | 9/2012 | Perentes | |
| 2013/0099597 A1 | 4/2013 | Perentes | |
| 2013/0220138 A1 | 8/2013 | Deuber | |
| 2013/0247774 A1 | 9/2013 | Macchiavelli | |
| 2013/0323366 A1 | 12/2013 | Gerbaulet | |
| 2014/0053734 A1 | 2/2014 | Santi | |
| 2014/0227414 A1 | 8/2014 | Perentes | |
| 2014/0263780 A1 | 9/2014 | Day, Jr. | |
| 2014/0290495 A1 | 10/2014 | Perentes | |
| 2014/0299000 A1 | 10/2014 | Hanneson | |
| 2015/0027375 A1 | 1/2015 | Cha | |
| 2015/0059587 A1 | 3/2015 | Colleoni | |
| 2015/0082989 A1 | 3/2015 | Besson | |
| 2015/0104550 A1 | 4/2015 | Oh | |
| 2015/0147448 A1 | 5/2015 | Lo Foro | |
| 2015/0157169 A1 | 6/2015 | Krüger | |
| 2015/0158665 A1 | 6/2015 | Krüger | |
| 2015/0183577 A1 | 7/2015 | Talon | |
| 2015/0225169 A1 | 8/2015 | Jarisch | |
| 2015/0238039 A1 | 8/2015 | Fischer | |
| 2015/0272375 A1 | 10/2015 | Flick | |
| 2015/0272376 A1 | 10/2015 | Flick | |
| 2015/0272380 A1 | 10/2015 | Flick | |
| 2015/0342394 A1 | 12/2015 | Bonacci | |
| 2016/0045060 A1 | 2/2016 | Flick | |
| 2016/0150907 A1 | 6/2016 | Bolognese | |
| 2016/0157666 A1 | 6/2016 | Brandsma | |
| 2016/0309946 A1 | 10/2016 | Gunstone | |
| 2017/0143157 A1 * | 5/2017 | Tentorio | A47J 31/3638 |
| 2019/0274467 A1 | 9/2019 | Ogink | |
| 2019/0335940 A1 | 11/2019 | Rijskamp | |
| 2019/0335942 A1 | 11/2019 | Rijskamp | |
| 2019/0343324 A1 | 11/2019 | Rijskamp | |
| 2019/0343325 A1 | 11/2019 | Ogink | |
| 2020/0000265 A1 | 1/2020 | Ogink | |
| 2020/0000268 A1 | 1/2020 | Ogink | |
| 2020/0000271 A1 | 1/2020 | Ogink | |

FOREIGN PATENT DOCUMENTS

| | | |
|---|---|---|
| CN | 1232212 | 10/1999 |
| CN | 1612831 | 5/2005 |
| CN | 101123905 | 2/2008 |
| CN | 101389551 | 3/2009 |
| CN | 100480150 | 4/2009 |
| CN | 201481108 | 5/2010 |
| CN | 101795605 | 8/2010 |
| CN | 102188161 | 9/2011 |
| CN | 102245065 | 11/2011 |
| CN | 103002781 | 3/2013 |
| CN | 103124509 | 5/2013 |
| CN | 202960135 | 6/2013 |
| CN | 103829804 | 6/2014 |
| CN | 104244780 | 12/2014 |
| CN | 104884368 | 9/2015 |
| CN | 105431358 | 3/2016 |
| CN | 105813958 | 7/2016 |
| DE | 10334526 | 2/2005 |
| DE | 202007002910 | 5/2007 |
| DE | 102005049624 | 7/2007 |
| DE | 202012005191 | 6/2012 |
| DE | 102012013094 | 11/2013 |
| DE | 202015100812 | 5/2016 |
| DE | 202015100813 | 5/2016 |
| DE | 202015100814 | 5/2016 |
| DE | 202015101266 | 6/2016 |
| EP | 0449533 | 10/1991 |
| EP | 0451980 | 10/1991 |
| EP | 1183975 | 3/2002 |
| EP | 1208782 | 5/2002 |
| EP | 1360919 | 11/2003 |
| EP | 1518484 | 3/2005 |
| EP | 1555219 | 7/2005 |
| EP | 1559351 | 8/2005 |
| EP | 1767129 | 3/2007 |
| EP | 1842467 | 10/2007 |
| EP | 1859713 | 11/2007 |
| EP | 1859714 B1 | 11/2007 |
| EP | 2033551 | 3/2009 |
| EP | 2071986 | 6/2009 |
| EP | 2071987 | 6/2009 |
| EP | 2230195 A1 | 9/2010 |
| EP | 2374383 B1 | 11/2011 |
| EP | 2409608 | 1/2012 |
| EP | 2409609 | 1/2012 |
| EP | 2471420 | 7/2012 |
| EP | 2656755 | 10/2013 |
| EP | 2687133 | 1/2014 |
| RU | 2012128493 A | 1/2014 |
| RU | 2591768 C2 | 7/2016 |
| RU | 2626940 | 8/2017 |
| WO | 0243541 | 6/2002 |
| WO | 2005016092 | 2/2005 |
| WO | 2006005736 | 1/2006 |
| WO | 2006014936 | 2/2006 |
| WO | 2006066625 | 6/2006 |
| WO | 2007016977 | 2/2007 |
| WO | 2007096196 | 8/2007 |
| WO | 2008004116 | 1/2008 |
| WO | 2008096385 | 8/2008 |
| WO | 2009016455 | 2/2009 |
| WO | 2009027131 | 3/2009 |
| WO | 2010013274 | 2/2010 |
| WO | 2010029512 | 3/2010 |
| WO | 2010076698 | 7/2010 |
| WO | 2010134054 | 11/2010 |
| WO | 2011015978 | 2/2011 |
| WO | 2011042401 | 4/2011 |
| WO | 2011069829 | 6/2011 |

(56) References Cited

FOREIGN PATENT DOCUMENTS

| | | |
|---|---|---|
| WO | 2011069830 | 6/2011 |
| WO | 2011076750 | 6/2011 |
| WO | 2011113854 A2 | 9/2011 |
| WO | 2011121125 | 10/2011 |
| WO | 2012001115 | 1/2012 |
| WO | 2012123440 | 9/2012 |
| WO | 2012156167 | 11/2012 |
| WO | 2013007776 | 1/2013 |
| WO | 2013008012 | 1/2013 |
| WO | 2013079814 | 6/2013 |
| WO | 2013144922 | 10/2013 |
| WO | 2014012778 | 1/2014 |
| WO | 2014012779 | 1/2014 |
| WO | 2014027079 | 2/2014 |
| WO | 2014029685 | 2/2014 |
| WO | 2014041605 | 3/2014 |
| WO | 2014056641 | 4/2014 |
| WO | 2014056642 | 4/2014 |
| WO | 2014056730 | 4/2014 |
| WO | 2014056810 | 4/2014 |
| WO | 2014056821 | 4/2014 |
| WO | 2014056862 | 4/2014 |
| WO | 2014060370 | 4/2014 |
| WO | 2014082975 | 6/2014 |
| WO | 2014082976 | 6/2014 |
| WO | 2014092406 | 6/2014 |
| WO | 2014096120 | 6/2014 |
| WO | 2014096121 | 6/2014 |
| WO | 2014132158 | 9/2014 |
| WO | 2014174462 | 10/2014 |
| WO | 2014183219 | 11/2014 |
| WO | 2014183783 | 11/2014 |
| WO | 2015004613 | 1/2015 |
| WO | 2015056022 | 4/2015 |
| WO | 2015082662 | 6/2015 |
| WO | 2015082663 | 6/2015 |
| WO | 2015082664 | 6/2015 |
| WO | 2015086371 | 6/2015 |
| WO | 2015109052 | 7/2015 |
| WO | 2015124627 | 8/2015 |
| WO | 2015144356 | 10/2015 |
| WO | 2015155145 | 10/2015 |
| WO | 2015158838 | 10/2015 |
| WO | 2015173123 | 11/2015 |
| WO | 2015193744 | 12/2015 |
| WO | 2016012562 | 1/2016 |
| WO | 2016055633 | 4/2016 |
| WO | 2016071795 | 5/2016 |
| WO | 2016082029 | 6/2016 |

OTHER PUBLICATIONS

International Preliminary Report on Patentability, PCT/NL2017/050510, 7 pages (Feb. 5, 2019).
International Preliminary Report on Patentability, PCT/NL2017/050511, 7 pages (Feb. 5, 2019).
International Preliminary Report on Patentability, PCT/NL2017/050512, 6 pages (Feb. 5, 2019).
International Preliminary Report on Patentability, PCT/NL2017/050513, 6 pages (Feb. 5, 2019).
International Preliminary Report on Patentability, PCT/NL2017/050514, 6 pages (Feb. 5, 2019).
International Preliminary Report on Patentability, PCT/NL2017/050515, 6 pages (Feb. 5, 2019).
International Preliminary Report on Patentability, PCT/NL2017/050519, 9 pages (Feb. 5, 2019).
International Preliminary Report on Patentability, PCT/NL2017/050521, 5 pages (Feb. 5, 2019).
International Preliminary Report on Patentability, PCT/NL2017/050522, 12 pages (Feb. 5, 2019).
International Search Report and Written Opinion, PCT/NL2017/050509, 11 pages (Jun. 5, 2018).
International Search Report and Written Opinion, PCT/NL2017/050510, 10 pages (Nov. 20, 2017).
International Search Report and Written Opinion, PCT/NL2017/050511, 9 pages (Nov. 30, 2017).
International Search Report and Written Opinion, PCT/NL2017/050512, 10 pages (Nov. 27, 2017).
International Search Report and Written Opinion, PCT/NL2017/050513, 8 pages (Dec. 22, 2017).
International Search Report and Written Opinion, PCT/NL2017/050514, 8 pages (Nov. 23, 2017).
International Search Report and Written Opinion, PCT/NL2017/050515, 10 pages (Nov. 27, 2017).
International Search Report and Written Opinion, PCT/NL2017/050519, 11 pages (Nov. 29, 2017).
International Search Report and Written Opinion, PCT/NL2017/050521, 8 pages (Dec. 4, 2017).
International Search Report and Written Opinion, PCT/NL2017/050522, 17 pages (Jan. 17, 2018).
Manual Jura Nespresso English, 22 pages.
Nespresso-I, 8 pages.
Nespresso-II, 2 pages (2003).
Nespresso-III, 2 pages (2003).
Nespresso-IV, 7 pages.
Nespresso-V, 5 pages (Apr. 2015).

\* cited by examiner

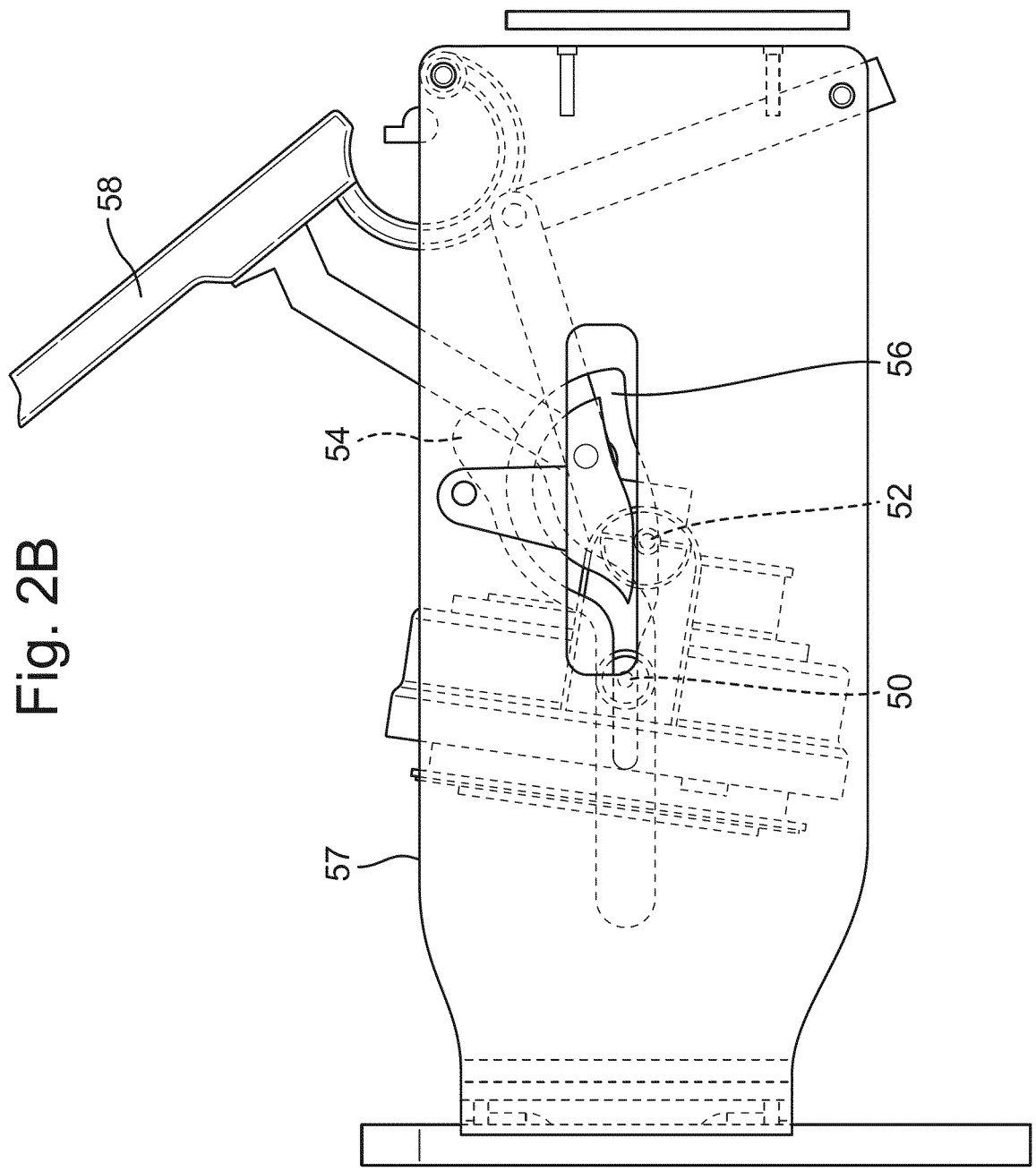

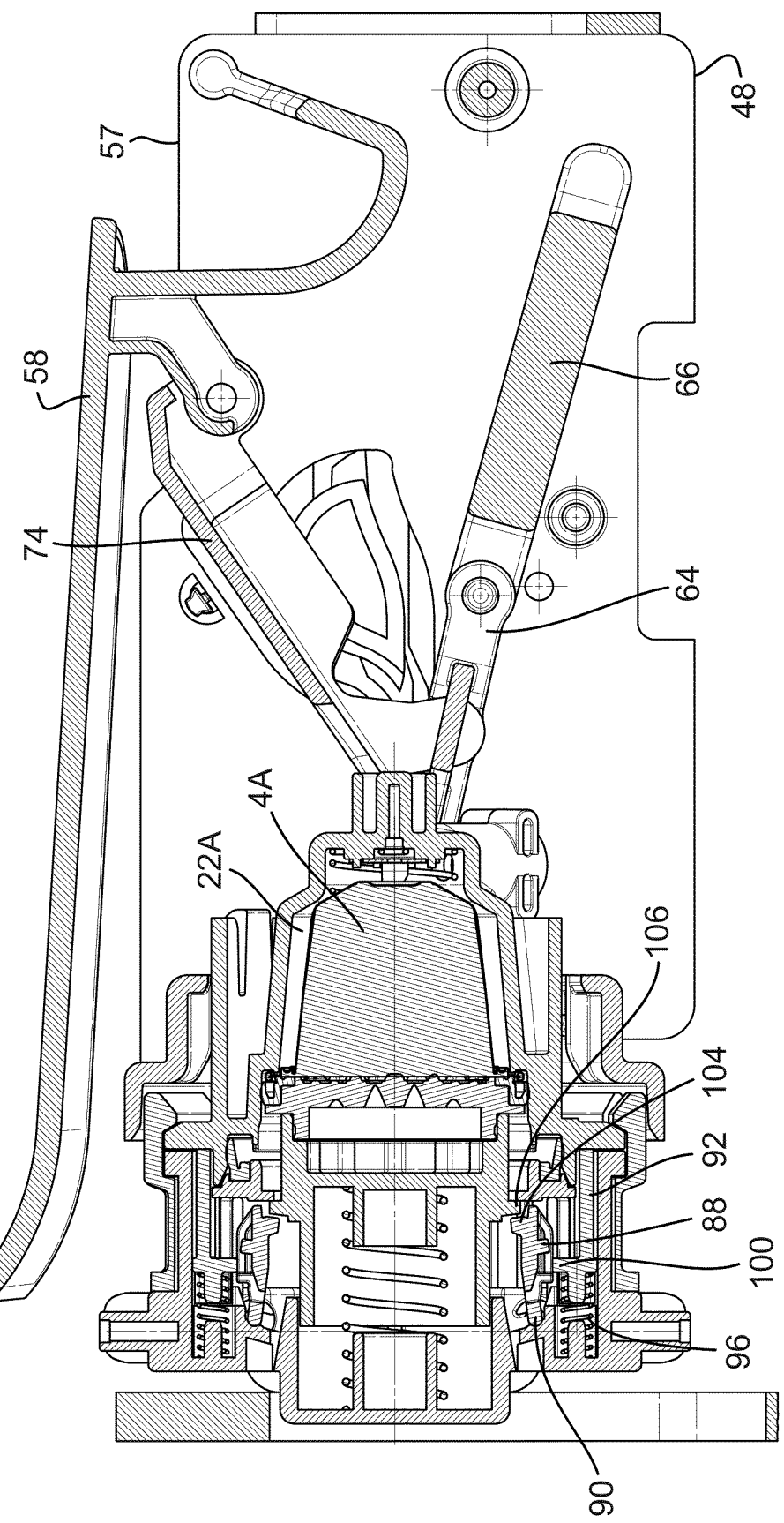

SYSTEM FOR PREPARING A BEVERAGE

CROSS-REFERENCE TO RELATED APPLICATIONS

This application is a continuation of International Application No. PCT/NL2017/050514 filed Aug. 3, 2017, which claims the benefit of and priority to Netherlands Patent Application No. NL 2017282 filed Aug. 3, 2016, the entire contents of each of which are hereby incorporated herein by reference.

BACKGROUND

The invention generally relates to a system for preparing a beverage. The invention also relates to an apparatus and method for preparing a beverage. More specifically the invention relates to a system for preparing a beverage using a capsule.

In such systems, proper confinement of the capsules within the apparatus is important. One reason for this is that in certain apparatuses, hot water is led through the capsules, possibly under pressure. Not properly confined capsules may lead to malfunction of the system and potentially hazardous situations.

SUMMARY

One important condition for proper confinement is proper positioning of the capsule in the apparatus. It is preferred to provide the system with features for supporting proper positioning within the apparatus. In certain cases, centering of the capsule at a particular position for preparing the beverage may be advantageous for the process of preparing the beverage.

A first aspect provides a system for preparing a quantity of beverage suitable for consumption. The system comprises a first exchangeable capsule and a second exchangeable capsule, the second exchangeable capsule being larger than the first exchangeable capsule and an apparatus including a first brew chamber part and a second brew chamber part forming a brew chamber for selectively holding one of the first and second exchangeable capsules, and a fluid dispensing device for supplying an amount of fluid, such as water, under pressure to the first brew chamber part. The first brew chamber part includes a cavity for selectively receiving the first or second exchangeable capsule and the first brew chamber part and the second exchangeable capsule are adapted to each other such that an outer part of the second exchangeable capsule engages at least part of the inner circumferential wall of the first brew chamber part when loading the second exchangeable capsule into the first brew chamber part.

Optionally, the cavity of the first brew chamber part is arranged for receiving the first or second capsule. The cavity of the first brew chamber part can be a predetermined cavity arranged for holding the first or second capsule. The cavity can have an invariable shape for holding the first or second capsule. The first brew chamber part can be arranged for holding the first or second capsule without changing a configuration of the first brew chamber part. The first brew chamber part can be a monolithic part.

The cavity of the first brew chamber part provides guidance to the second exchangeable capsule, ensuring proper positioning before commencing the process of preparing the beverage.

In one embodiment, the outer part comprises a protrusion. An advantage of this embodiments is that the shape of the outer wall of the second capsule is not defined by the inner shape of the cavity. This provides freedom of design.

In another embodiment, the protrusion comprises at least two ribs extending from an outer circumferential wall, which ribs are annularly substantially equidistantly distributed over the circumferential wall and extending from a centre (center) axis of the second exchangeable capsule.

Providing ribs allows a simple mould to be used for manufacturing of the second capsule. Furthermore, the amount of material required for providing the ribs is relatively low.

In a further embodiment, the part of the inner circumferential wall of the cavity that the second exchangeable capsule is arranged to engage with is an outer edge of the inner circumferential wall of the cavity and the outer part of the second exchangeable capsule comprises a flange comprising a thickened part at the outer edge of the flange.

This embodiment allows proper positioning at the top of the capsule and at a position where both parts of the brew chamber meet. Hence, with this embodiment, proper alignment of the two brew chamber parts and the capsule, three components, may be further ensured.

In yet another embodiment, the first brew chamber part and the second capsule are adapted to each other such that the second capsule centres (centers) in the cavity by means of the outer part.

Positioning of the capsule within the cavity is important and within the definition of positioning, centering of the capsule is important.

In again a further embodiment, the first brew chamber part includes a centering module at the bottom of the cavity, wherein the first and second exchangeable capsules are arranged to cooperate with the centering module for centering the first and second capsules near the bottom of the cavity.

In certain embodiments of the system, the capsule may comprise means for positioning and centering in particular at the top of the capsule. In such embodiments, additional centering at the bottom of the second capsule may be required. This embodiment provides such additional centering at the bottom of the second capsule.

In again another embodiment, the first brew chamber part and the first exchangeable capsule are adapted to each other such that a flange like rim of the first exchangeable capsule engages at least part of an inner circumferential wall of the first brew chamber part when loading the first exchangeable capsule into the first brewing chamber part.

This embodiment provides additional centering at the point where the two parts of the brew chamber meet, as well as for the first capsule. This provides advantages of proper alignment as discussed above, not only for the second capsule, but also for the first capsule. This is an important advantage, as it allows for safe and reliable use of two types of capsules within one and the same apparatus.

According to an aspect is provided an apparatus of the system as described herein.

According to an aspect is provided a method for preparing a quantity of beverage suitable for consumption as described herein.

According to an aspect is provided a capsule, and a set of a first and second capsule as described herein.

It will be appreciated that any of the embodiments, aspects, features and options described in view of the system apply equally to the apparatus, capsules and method. It will also be clear that any one or more of the above embodiments, aspects, features and options can be combined.

BRIEF DESCRIPTION OF THE DRAWINGS

The invention will further be elucidated on the basis of exemplary embodiments which are represented in drawings. The exemplary embodiments are given by way of non-limitative illustration. It is noted that the figures are only schematic representations of embodiments of the invention that are given by way of non-limiting example.

In the drawings:

FIG. 2B shows the schematic representation of the system from a side;

FIG. 3A, 3B, 4A, 4B, 5A, 5B, 5C, 6A, 6B, 7A, 7B, 8A, and FIG. 8B show the schematic representation of the system from a side in further detail.

DETAILED DESCRIPTION OF THE EMBODIMENTS

Figure 1A:
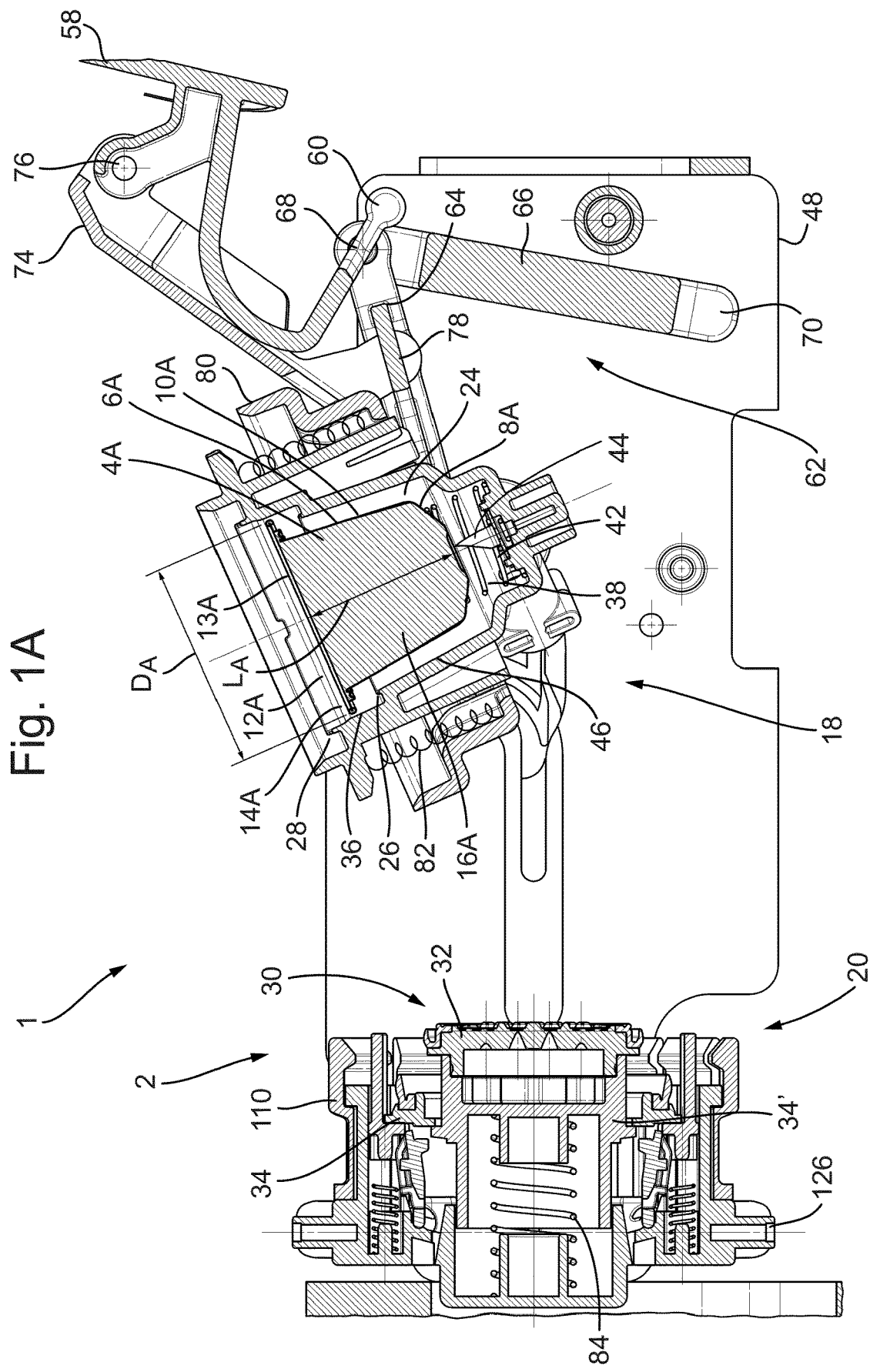
FIGS. 1A and 1B show schematic representations of a system.
Figure 1B:
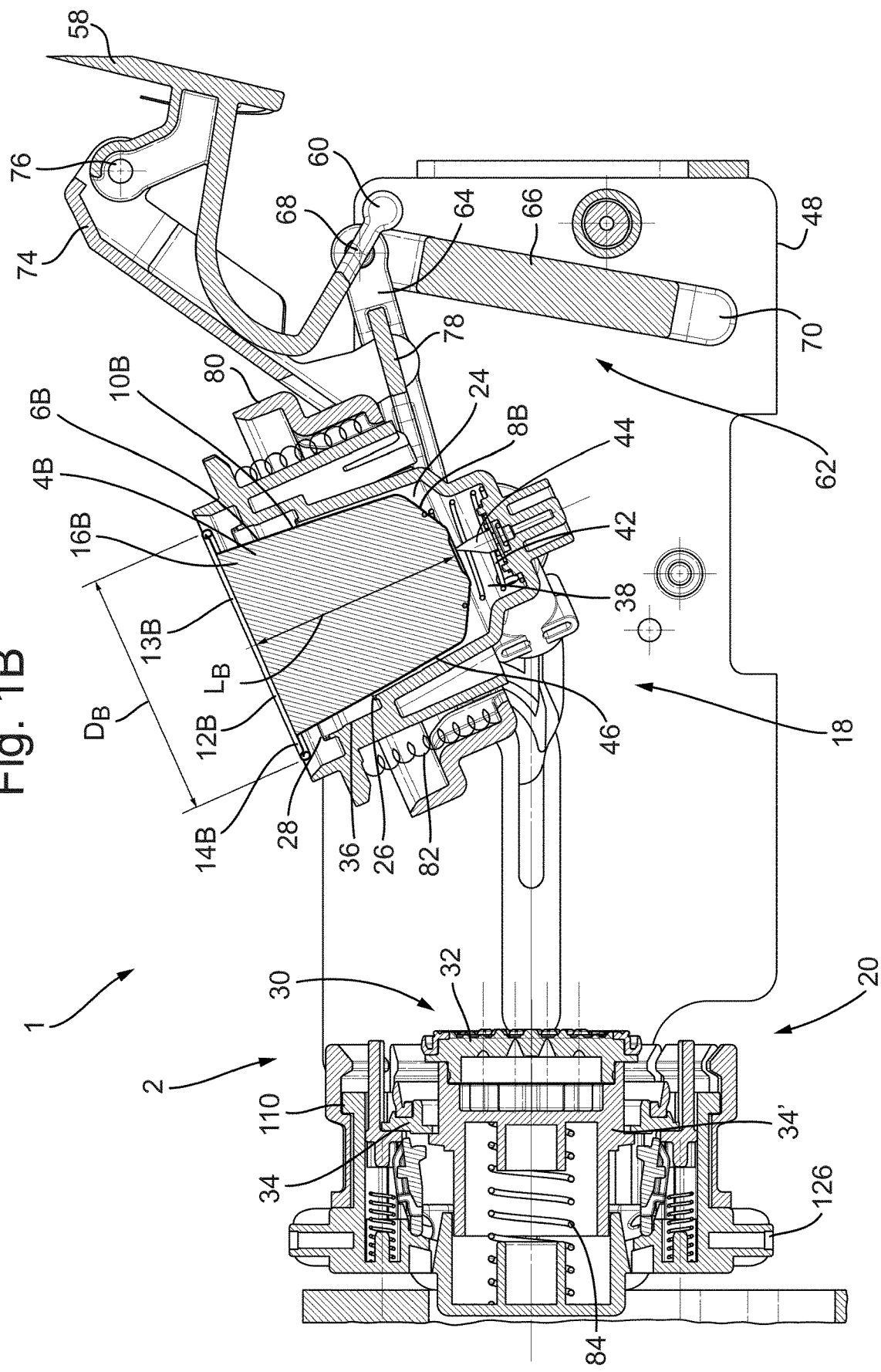

FIGS. 1A and 1B show schematic cross sectional views of a system 1 for preparing a beverage. The system includes an apparatus 2 and an exchangeable capsule. Here the system 1 is arranged for cooperating with a first capsule 4A and a second capsule 4B. The apparatus 2 shown in FIGS. 1A and 1B is one and the same apparatus. The apparatus 2 is arranged for selectively cooperating with either the first capsule 4A (see FIG. 1A) or the second capsule 4B (see FIG. 1B). It will be appreciated that the system 1 can include the apparatus 2, the first capsule 4A and the second capsule 4B.

The first and second capsules 4A, 4B are of a different type. In this example, the second capsule 4B is larger than the first capsule 4A. An axial length $L_B$ of the second capsule 4B is larger than an axial length $L_A$ of the first capsule 4A. A diameter $D_B$ of the second capsule 4B is a larger than a diameter $D_A$ of the first capsule 4A. Notwithstanding the differences, in this example the first and second capsules 4A, 4B are designed to make a similar visual impression. The first and second capsules 4A, 4B are designed to have a family look and feel. Here a ratio of the axial length and diameter $L_A/D_A$ of the first capsule 4A is substantially the same as a ratio of the axial length and diameter $L_B/D_B$ of the second capsule 4B. Preferably, the length to diameter ratio of the first and second capsules is identical within 20%, preferably within 10%, e.g. identical.

In view of the similarity, both capsules 4A, 4B will now be described simultaneously. In this example, the capsules 4A, 4B both include a cup-shaped body 6A, 6B. Here the cup-shaped body 6A, 6B includes a bottom 8A 8B and a circumferential wall 10A, 10B. The bottom 8A, 8B and the circumferential wall 10A, 10B can form a monolithic part. The capsules 4A, 4B both include a lid 12A, 12B. The lid 12A, 12B closes off an open end of the cup-shaped body 6A, 6B. The lid 12A, 12B includes an exit area 13A, 13B through which beverage can be drained from the capsule as explained below. In this example the lid 12A, 12B is connected to a flange-like rim 14A, 14B of the capsule 4A, 4B. Here the rim 14A, 14B is an outwardly extending rim. The bottom 8A, 8B, the circumferential wall 10A, 10B and the rim 14A, 14B can form a monolithic part. Here the exit area 13A, 13B defines the area of the lid 12A, 12B through which the beverage can potentially exit the capsule 4A, 4B. Hence, an area of the lid 12A, 12B sealed to the rim 14A, 14B does not constitute part of the exit area 13A, 13B. In this example, the capsules 4A, 4B are substantially rotation symmetric around an axis extending from the bottom 8A, 8B to the lid 12A, 12B. The cup-shaped body 6A, 6B and the lid 12A, 12B enclose an inner space 16A, 16B of the capsule. The inner space 16A, 16B includes a quantity of beverage ingredient, such as an extractable or soluble substance. The beverage ingredient can e.g. be roast and ground coffee, tea, or the like. The beverage ingredient can be powdered coffee. The beverage ingredient can be a liquid. In view of the difference in size of the capsules 4A, 4B it will be appreciated that the second capsule 4B can include a larger quantity of beverage ingredient than the first capsule 4A. In this example, the inner space 16B of the second capsule 4B is about twice the inner space 16A of the first capsule 4A. For example, the first capsule 4A may include 4-8 grams, e.g. about 6 grams, of ground coffee. For example, the second capsule 4B may include 8-16 grams, e.g. about 12 grams, of ground coffee.

The cup-shaped body 6A, 6B can be manufactured from a metal foil, such as aluminium foil, a plastics material, such as polypropylene or polyethylene, or a combination thereof. The cup-shaped body 6A, 6B can be manufactured by pressing, deep-drawing, vacuum forming, injection moulding or the like. The lid can be manufactured from a metal foil, such as aluminium foil, a plastics material, such as polypropylene or polyethylene, or a combination thereof. In the example the capsules 4A, 4B are so-called closed capsules. This indicates capsules that are hermetically closed prior to insertion into the apparatus. The closed capsules can be opened by the apparatus as described below. Alternatively, non-sealed or refillable capsules could also be used.

The apparatus includes a first brew chamber part 18 and a second brew chamber part 20. The first and second brew chamber parts 18, 20 can be closed against each other to form a brew chamber 22A, 22B (not shown in FIGS. 1A, 1B).

The first brew chamber part 18 includes a cavity 24. The cavity 24 is arranged for receiving the first or second capsule 4A, 4B. Here the cavity 24 of the first brew chamber part 18 is a predetermined cavity 24 arranged for holding the first or second capsule 4A, 4B. Here the cavity 24 has an invariable shape for holding the first or second capsule 4A, 4B. Here the first brew chamber part 18 is arranged for holding the first or second capsule 4A, 4B without changing a configuration of the first brew chamber part 18. In this example the first brew chamber part 18 is a monolithic part. In this example the first brew chamber part 18 includes a first abutment surface 26. The first abutment surface is positioned inside the cavity 24. Here the first abutment surface 26 is a first generally annular abutment surface. The first generally annular abutment surface 26 can be continuously annular, or it may be interrupted annular, such as comprising a plurality of segments along an annulus. The first abutment surface 26 may for example take the shape of one or more, e.g. arched, ridges which protrude into cavity 22. Here the first abutment surface 26 provides the cavity 22 with a stepped shape. In this example the first brew chamber part 18 includes a second abutment surface 28. The second abutment surface is positioned near the open end of the cavity 24. Here the second abutment surface 28 is a second generally annular abutment surface. The second generally annular abutment surface 28 can be continuously annular, or it may be interrupted annular, such as comprising a plurality of segments along an annulus. The second abutment surface 28 may for example take the shape of one or more, e.g. arched, ridges. It will be appreciated that the first abutment surface 26 and the second abutment surface 28 are spaced at a mutual distance in an axial direction of the first brew chamber part 18. The first abutment surface 26 and the second abutment surface are positioned at a fixed spacing. The first abutment surface 26 and the second abutment surface are immobile relative to each other. Here, the first brew chamber part 18 includes an ejector 38. In this example the ejector 38 includes a conical ring and a resilient element 42, here a helical spring. The first brew chamber part 18 includes piercing means 44 for piercing the bottom of the capsule. Here the piercing means includes a plurality of knives, such as three knives.

The second brew chamber part 20 includes an extraction plate 30. In this example, the extraction plate 30 includes a central portion 32 and a peripheral portion 34. The central portion 32 is movable relative to the peripheral portion 34. Here the central portion 32 is movable in an axial direction of the second brew chamber part 20.

The system 1 as describes thus far can be used for preparing a beverage as follows. Further features of the system 1 will be explained along the way.

In the example of FIGS. 1A and 1B the apparatus 2 is in a state ready for receiving a capsule. In FIGS. 1A and 1B the capsule 4A, 4B has just been inserted into the cavity of the first brew chamber part 18. The first brew chamber part 18 is in an inclined position. The open end of the cavity 24 points upwards.

As shown in FIG. 1A, the first capsule 4A can fall into the cavity 24 under the influence of gravity. Herein the rim 14A of the first capsule 4A is guided by an inner surface 36 of the first brew chamber part 18. The bottom 8A of the first capsule 4A lowers into the cavity 24 until it abuts against the ejector 38. Here the bottom 8A of the first capsule 4A centres (centers) on the ejector 38. It will be appreciated that the rim 14A of the first capsule 4A is positioned between the first abutment surface 26 and the second abutment surface 28. The bottom 8A of the first capsule 4A is not yet pierced in this state.

As shown in FIG. 1B, the second capsule 4B can also fall into the cavity 24 under the influence of gravity. Herein the circumferential wall 10B of the second capsule 4B is guided by an inner surface 46 of the first brew chamber part 18. Alternatively, other parts of the second capsule 4B may be guided by the inner surface 46 of the first brew chamber part 18.

Figure 9A:
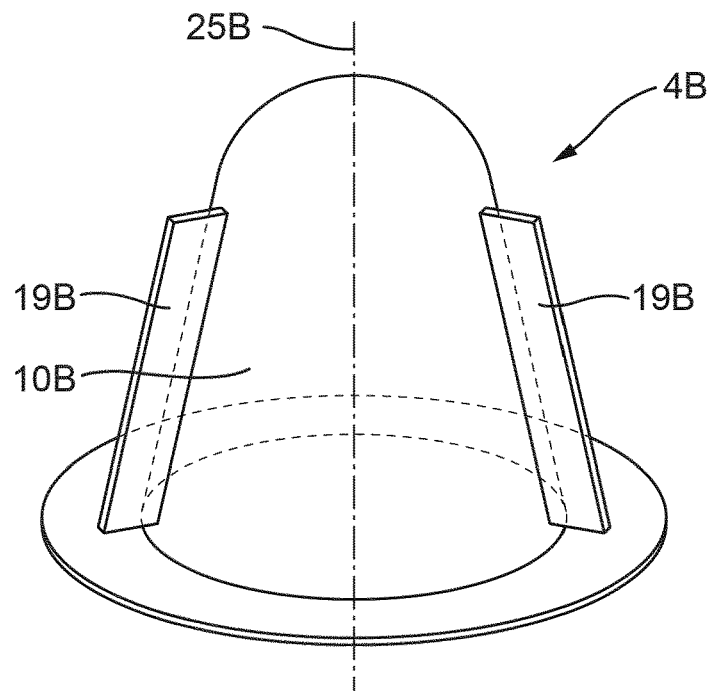
FIG. 9A, 9B, 9C, 9D, and FIG. 9E show various embodiments of a capsule.

FIG. 9A shows another embodiment of the second capsule 4B. In this embodiment, the second capsule 4B comprises lateral ribs 19B having substantially the same length. The lateral ribs 19B are annularly substantially equidistantly distributed over the circumferential wall 10B of the second capsule 4B. The lateral ribs 19B extend outward from the circumferential wall 10B as extending from a centre (center) axis 25B of the second capsule.

Figure 6B:
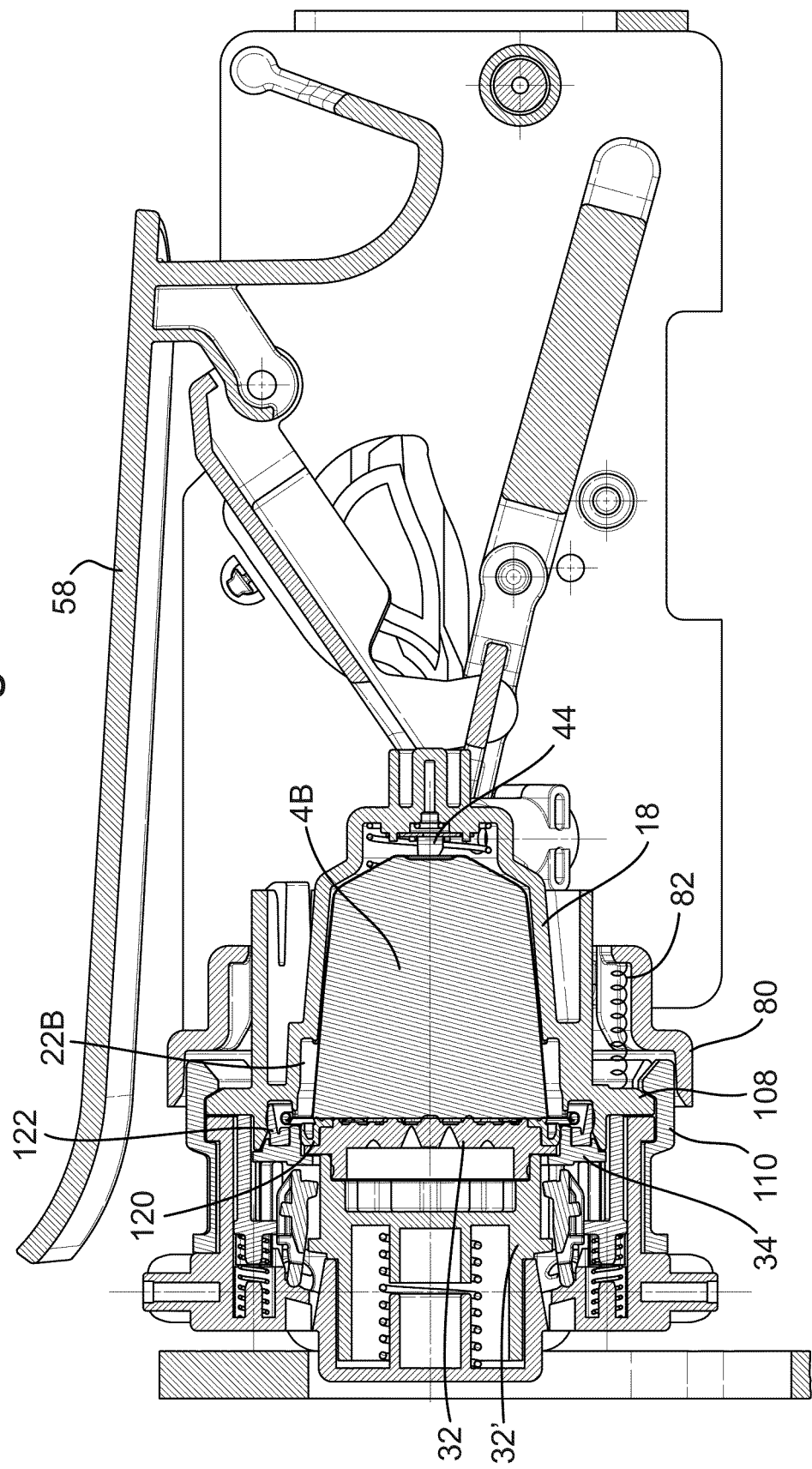

In this embodiment, the second capsule 4B is guided by the inner surface 46 of the first brew chamber part 18 via the lateral ribs 19B as outer part of the second capsule 4B. Furthermore, the lateral ribs 19B support centering of the second capsule 4B in the second brew chamber part 18. With the second capsule 4B in the position as depicted by FIG. 6B, the ends of the lateral ribs 19B all touch the inner surface 46. As the lateral ribs 19B extend from the circumferential wall 10B at substantially the same length, the second capsule 4B is centred (centered) in the first brew chamber part 18 and the cavity 24 in particular. For proper centering, at least two lateral ribs 19B are required and at least three lateral ribs 19B are preferred.

Figure 9B:
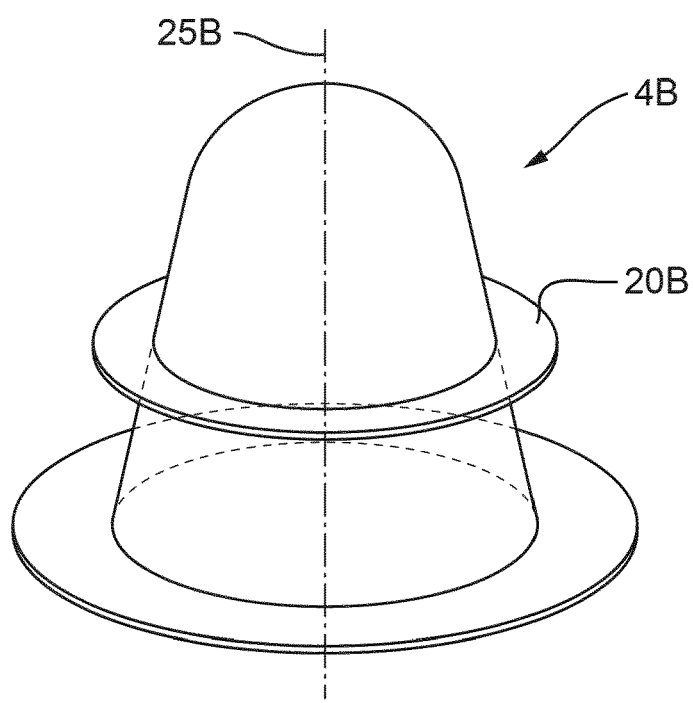

FIG. 9B shows a further embodiment of the second capsule 4B. In this embodiment, the second capsule comprises an annular protrusion 20B. The annular protrusion 20B is in this embodiment provided as a continuous ring 20B. The centre (center) of the ring 20B coincides with the centre axis 25B of the second capsule 4B. The ring 20B protrudes from the circumferential wall 10B.

In this embodiment, the second capsule 4B is guided by the inner surface 46 of the first brew chamber part 18 via the annular protrusion 20B as outer part of the second capsule 4B. Furthermore, the annular protrusion 20B supports centering of the second capsule 4B in the second brew chamber part 18. With the second capsule 4B in the position as depicted by FIG. 6B, the ends of the annular protrusion 20B touches the inner surface 46. As the annular protrusion 20B is provided concentrically with the second capsule 4B, the second capsule 4B is centred in the first brew chamber part 18 and the cavity 24 in particular.

Figure 9C:
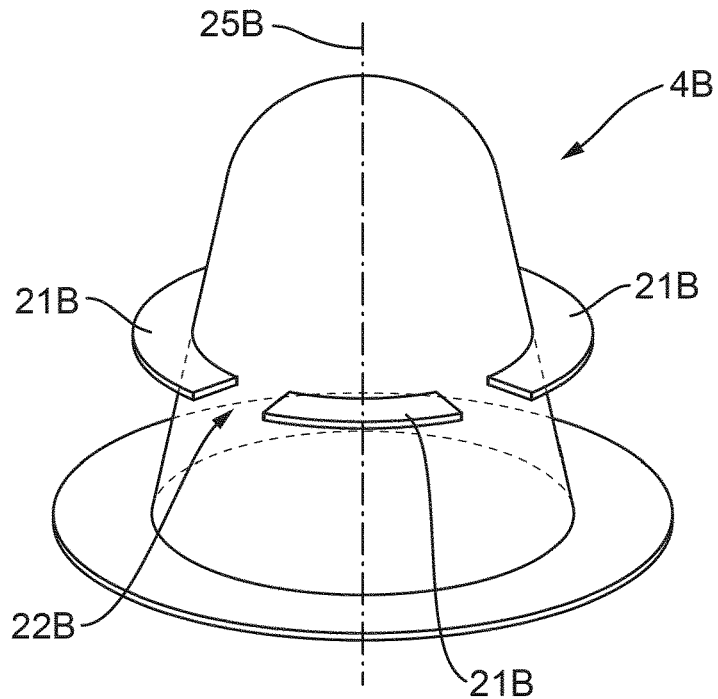

FIG. 9C shows yet another embodiment of the second capsule 4B. In this embodiment, the second capsule comprises an annular protrusion parts 21B, separated by protrusion gaps 22B. The annular protrusion parts 21B provide the same guiding and centering as with the annular protrusion 20B as discussed above.

Figure 9D:
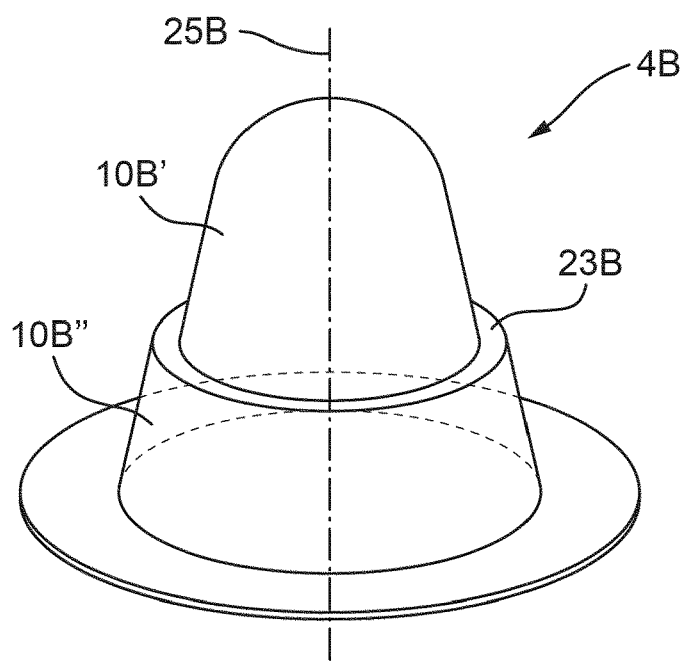

FIG. 9D shows yet a further embodiment of the second capsule 4B. In this embodiment, circumferential wall 10B of the second capsule comprises a first circumferential wall part 10B' and a second circumferential wall part 10B". Both the first circumferential wall part 10B' and the second circumferential wall part 10B" are centered around the centre axis 25B of the second capsule 4B. Between the first circumferential wall part 10B' and the second circumferential wall part 10B", a step plateau 23B is provided. The top of the second circumferential wall part 10B" has a larger diameter than the diameter bottom of the first circumferential wall part 10B'. In another embodiment, the top of the second circumferential wall part 10B" has a smaller diameter than the diameter bottom of the first circumferential wall part 10B'.

In this embodiment, the second capsule 4B is guided by the inner surface 46 of the first brew chamber part 18 via the second circumferential wall part 10B" as outer part of the second capsule 4B. Furthermore, the second circumferential wall part 10B" supports centering of the second capsule 4B in the second brew chamber part 18 and the cavity 24 in particular. With the second capsule 4B in the position as depicted by FIG. 6B, the second circumferential wall part 10B" touches the inner surface 46.

As the second circumferential wall part 10B" is provided concentrically with the second capsule 4B, the second capsule 4B is centred (centered) in the first brew chamber part 18 and the cavity 24 in particular. In case the top of the second circumferential wall part 10B" has a smaller diameter than the diameter bottom of the first circumferential wall part 10B', the guiding and centering is provided via the first circumferential part 10B'.

Figure 9E:
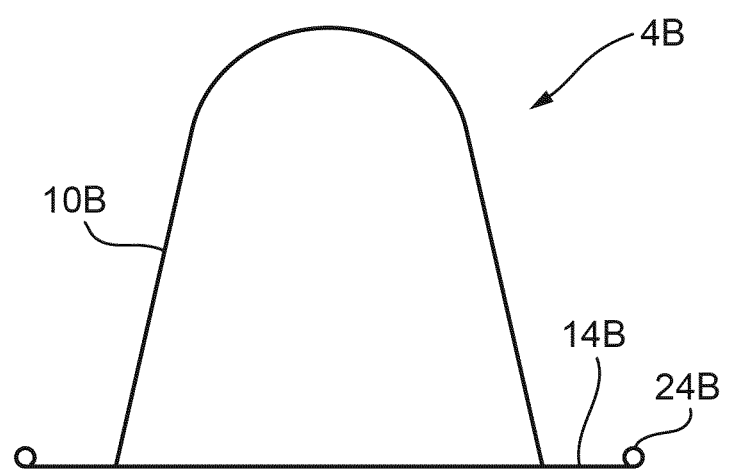

FIG. 9E shows yet a further embodiment of the second capsule 4B. In this embodiment, circumferential wall 10B and the flange-like rim 14B in particular comprises a thickened outer ring 24B. In the embodiment shown, the outer ring 24B extends towards the bottom 8B of the second capsule 4B and the flange-like rim 14B is flush with the top of the second capsule 4B. In other embodiments, the outer ring 24B extends beyond the top of the second capsule 4B.

The outer ring 24B is arranged to support centering of the second capsule 4B in the cavity 24 of the second brew chamber part 18. This support is provided by providing the outer ring 24B to have an inner diameter that is slightly larger than the outer diameter of the second abutment surface 28 (FIG. 4B). This allows the outer ring 24B to fit over the second abutment surface 28 at the end of the inner surface 46 of the cavity 24. And if the outer ring 24B is fit over the second abutment surface 28, the second capsule is centred in the cavity 24.

Whereas the embodiments shown by FIG. 9A, FIG. 9B, FIG. 9C, FIG. 9D, and FIG. 9E are shown as distinct embodiments, the specific features may be combined for providing further embodiments, in any permutation possible.

The bottom 8B of the second capsule 4B lowers into the cavity 24 until it abuts against the ejector 38. Here the bottom 8B of the second capsule 4B centers on the ejector 38. As discussed, the ejector may comprises a conical ring and a resilient element 42. The resilient element 42 may be embodied as a helical spring 42 and in particular a helical spring having a circular cross-section.

With the helical spring 42 having a circular cross-section and protruding outward from the bottom of the first brew chamber part 18, in particular a distal end of the helical spring 42 protrudes from the bottom of the first brew chamber part 18. As the helical spring 42 is open at the distal end, it may receive objects. In this embodiment, the distal end of the helical spring 42 is arranged for receiving the bottom 8B of the second capsule 4B. As the bottom 8B of the second capsule 4B has a conical shape, the second capsule 4B automatically centres with the open distal end of the helical spring 42 and in that way, with the first brew chamber part 18 and the cavity 24 in particular.

As discussed above, the ejector 38 may include a conical ring. The conical ring is provided concentrically within the cavity 24 of the second brew chamber part 18. Furthermore, the conical ring preferably has at a distal side facing away from the bottom of the cavity a first diameter that is larger than a second diameter at a proximal end facing the bottom of the cavity 24.

In particularly preferred embodiment, the conical ring has an inner shape, within the conical ring, that is substantially the same as the outer shape of the bottom 8B of the second capsule 4B. This allows the conical ring to accommodate the bottom 8B of the second capsule 4B—or at least part thereof. This provides alternative or additional support at guiding and centering of the second capsule 4B within the second brew chamber part 18 and the cavity 24 thereof in particular.

Embodiments of the second capsule 4B that have no outer parts acting as particular guiding members near the bottom 8B of the second capsule 4B are with such embodiments as described directly above provided with improved centering within the cavity 24. Also use of other embodiments of the second capsule 4B and the first capsule 4A may be improved by means of such centering module.

It will be appreciated that the rim 14B of the second capsule 4B is positioned beyond the second abutment surface 28 when seen from the piercing means 44. The bottom 8B of the second capsule 4B is not yet pierced in this state.

Once the capsule 4A, 4B is inserted into the cavity 24 as shown in FIGS. 1A and 1B, the first brew chamber part 18 can be moved towards the second brew chamber part 20 for closing the brew chamber around the capsule 4A, 4B. The first brew chamber part 18 is guided in a frame 48 of the apparatus.

Figure 2A:
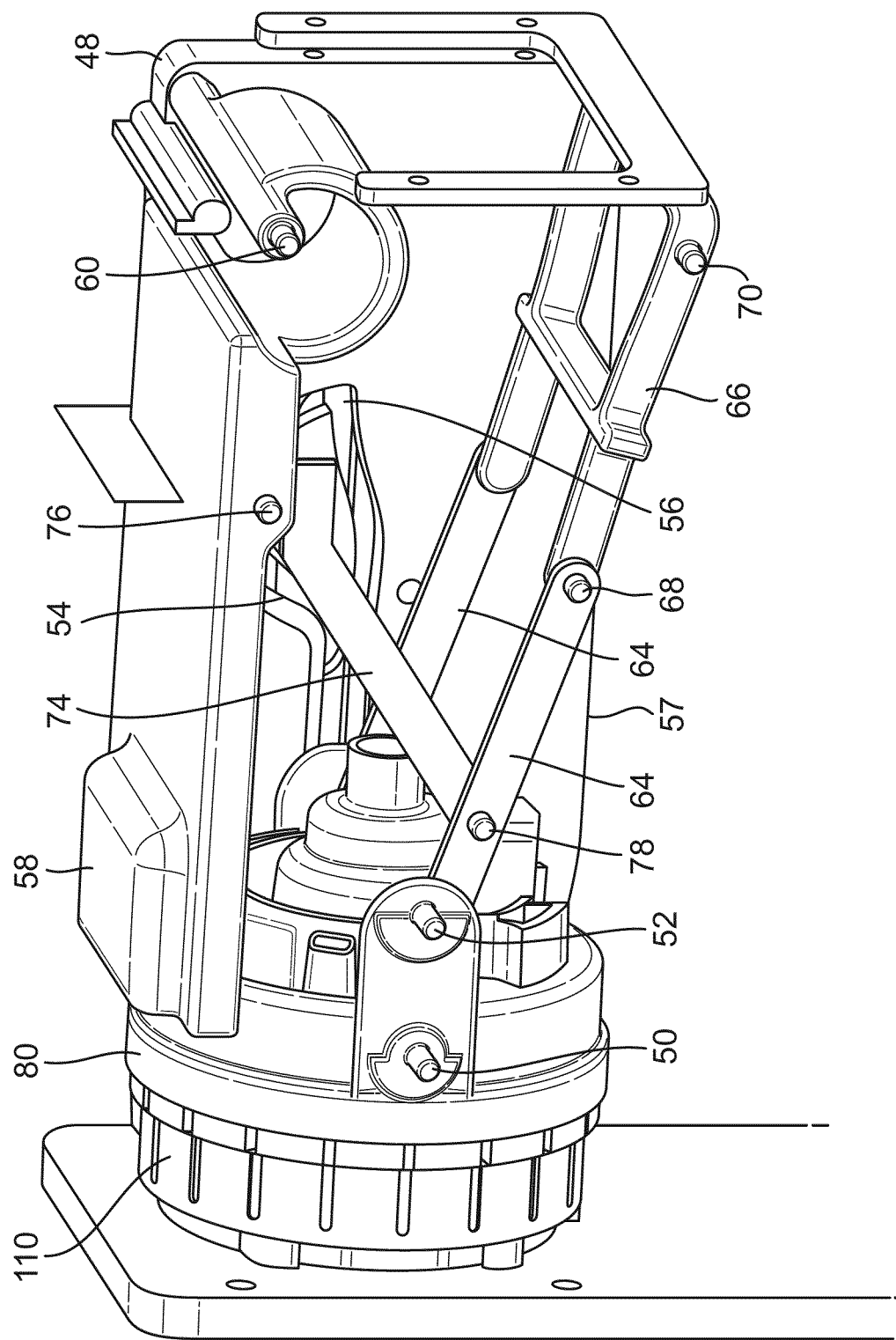
FIG. 2A shows the schematic representations of the system in perspective view.

In this example the first brew chamber part 18 includes first bosses 50 and second bosses 52 as shown in FIGS. 2A and 2B. The first bosses 50 are guided in a first groove 54 of the frame 48. The second bosses 52 are guided in a second groove 56 of the frame 48. It will be appreciated that the bosses 50, 52 and grooves 54, 56 determine the path that will be followed by the first brew chamber part 18. Here the first groove 54 and the second groove 56 are provided in a side wall 57 of the frame 48. The first groove 54 extends into the side wall 57 to a first depth. The second groove 56 extends into the side wall to a second depth. The second depth is larger than the first depth. The first boss 50 has a larger diameter than the second boss 52. The first groove 54 has a larger width than the second groove 56. The width of the first groove 54 corresponds to the diameter of the first boss 50. The width of the second groove 56 corresponds to the width of the second boss 52. It will be appreciated that the first groove 54 extends along a different trajectory than the second groove 56. The different widths and depths of the grooves allow the first and second bosses 50, 52 to follow different trajectories. This construction allows a very compact construction for guiding the first and second bosses 50, 52.

The apparatus 2 includes a lever 58. The lever can be actuated manually by a user. The lever is pivotally connected to the frame 48 around a lever axis 60. The first brew chamber part 18 is connected to the frame 48 via a knee joint 62. The knee joint 62 includes a push rod 64 and a crank 66. The push rod 64 is pivotally connected to the crank 66 at a knee axis 68. The crank 66 is pivotally connected to the frame 48 at a crank axis 70. The lever 58 is connected to the knee joint 62 for actuating the first brew chamber part 18 in motion. Here the lever 58 is connected to the knee joint 62 through a lever link 74. The lever link 74 is pivotally connected to the lever 58 at a lever link axis 76. The lever link 74 is pivotally connected to the push rod 74 at a knee link axis 78.

An arresting ring 80 is arranged surrounding the first brew chamber part 18. The arresting ring 80 is axially movable relative to the first brew chamber part 18. Here, the arresting ring 80 is guided by an external surface of the first brew chamber part 18. The arresting ring is connected to the first brew chamber part via one or more resilient elements 82, here helical springs. The push rod is pivotally connected to the arresting ring 80 at a push rod axis 72. Hence, here the knee joint 62 is indirectly connected to the first brew chamber part 18, viz. via the arresting ring 80 and one or more resilient elements 82. The function of the arresting ring will be set out below.

When the lever 58 is moved in a downward direction the knee joint 62 will push the first brew chamber part 18 towards the second brew chamber part 20. Simultaneously, due to the shape of the first and second grooves 54, 56, the first brew chamber part 18 will be rotated from the upwards inclined orientation into a an aligned orientation in which an axial direction of the first brew chamber part 18 is aligned with an axial direction of the second brew chamber part 20.

As mentioned above, the apparatus 2 is arranged for selectively cooperating with either the first capsule 4A or the second capsule 4B. Here, the system 1 is arranged for automatically adjusting the brew chamber depending on whether the first or the second capsule has been inserted. This provides the advantage that no user input is required for selecting proper handling of the first or second capsule. Hence, the risk of errors is greatly reduced.

As mentioned, the second brew chamber part 20 includes an extraction plate 30 with a central portion 32 and a peripheral portion 34. Here the central portion 32 is movable in an axial direction of the second brew chamber part 20. The central portion 32 in this example includes a shaft 32' axially slidably movable with respect to the frame 48. The central portion 32 is connected to the frame 48 via a resilient member 84, here a helical spring. The resilient member 84 biases the central portion into a ready position in FIGS. 1A and 1B. The ready position is an extended position in this example. The central portion 32 can be positioned in a first brewing position for cooperating with the first capsule 4A. The central portion can be positioned in a second brewing position for cooperating with the second capsule 4B. In this example, the system 1 includes a locking mechanism 86 arranged for locking the central portion 32 in or near the first brewing position when the cavity 24 holds the first capsule 4A.

The locking mechanism 86 includes a locker 88. Here the locker 88 is designed as a pivotable finger, pivotable around a pivoting axis 90. The locker 88 is biased into a position pivoted away from the shaft 32'. The locker could also be biased into any other suitable position. The locking mechanism 86 further includes a pusher 92. The pusher is slidably guided in a body 94 of the second brew part 20. The pusher 92 is connected to the body 94 via a resilient member 96, here a helical spring. The resilient member 96 biases the pusher in an extended position. The first brew chamber part 18 includes an actuator 98. Here the actuator is formed by a frontal surface of the first brew chamber part 18.

Figure 3A:
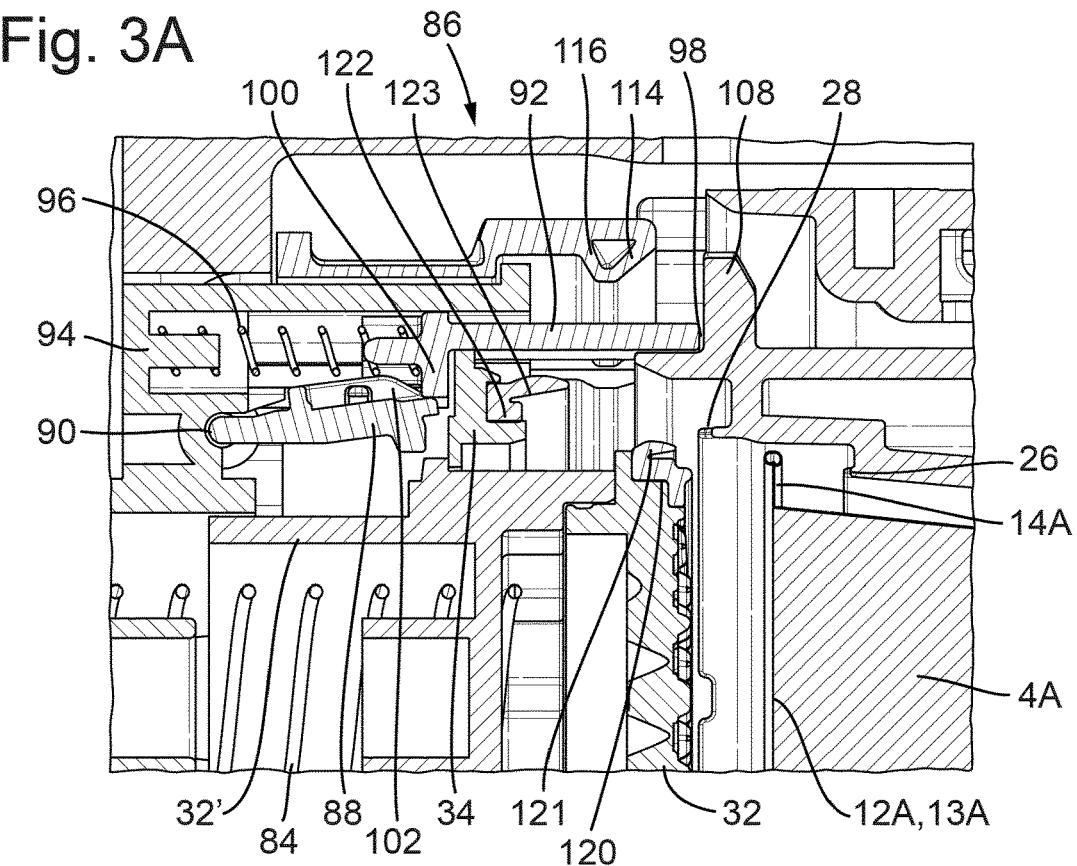
Figure 3B:
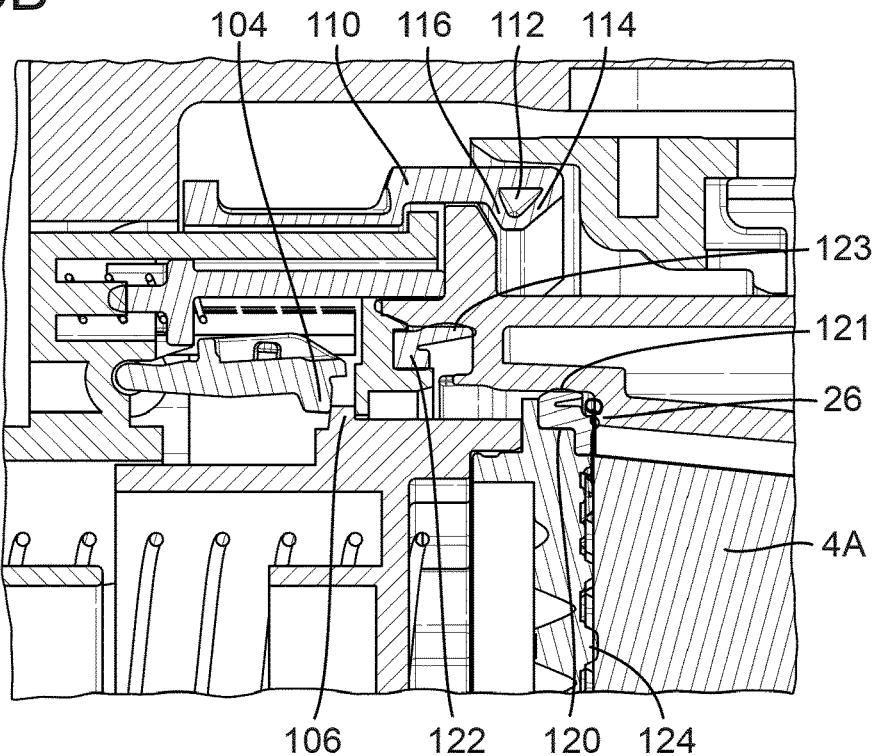

FIGS. 3A and 3B show functioning of the locking mechanism 86 when the cavity 24 holds the first capsule 4A. In this example, an outermost part of the first capsule 4A, here formed by the lid 12A, exit area 13A and/or rim 14A, is positioned rearwardly, i.e. more towards the piercing means 44, relative to the actuator 98. As a result, when advancing the first capsule 4A towards the second brew chamber part 20, the actuator 98 will touch the pusher 92 before the outermost part of the first capsule 4A will touch the central portion 32. The pusher is pushed against the biasing force of the resilient member 96. A lip 100 of the pusher 92 will slide along a sloping surface 102 of the locker 88, causing the locker 88 to pivot towards the shaft 32'. As a result, a thumb 104 of the locker 88 is placed in a path of movement of part 106 of the central portion 32 (see FIG. 3B). When the first capsule 4A is advanced further towards the second brew chamber part 20 the first capsule 4A will abut against the central portion 32. This can cause the central portion to be pushed against the biasing force of the resilient member 84. The pivoted locker 88 prevents travel of the central portion beyond a position where the part 106 abuts against the thumb 104. This is herein defined as the first brewing position. Hence, the first capsule 4A is arranged for moving the central portion 32 from the ready position to the first brewing position. The first capsule 4A is held between the first and second brew chamber parts 18, 20 while brewing, wherein the central portion 32 is in the first brewing position.

Figure 4A:
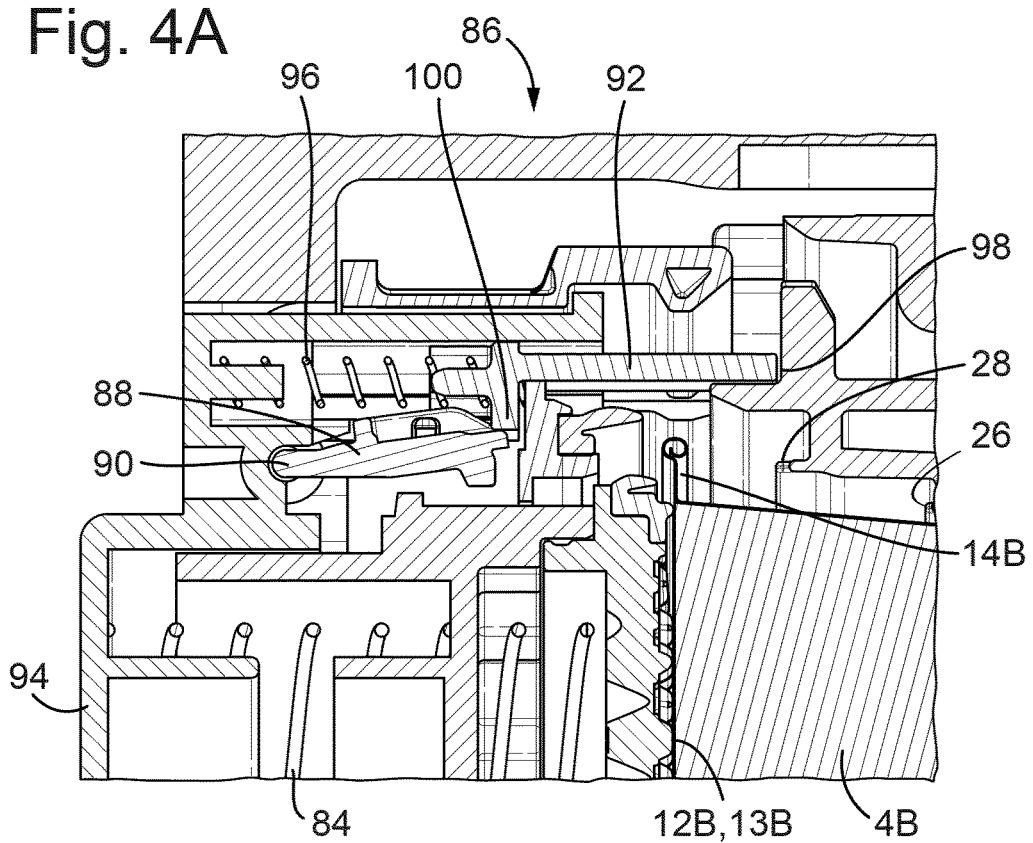
Figure 4B:
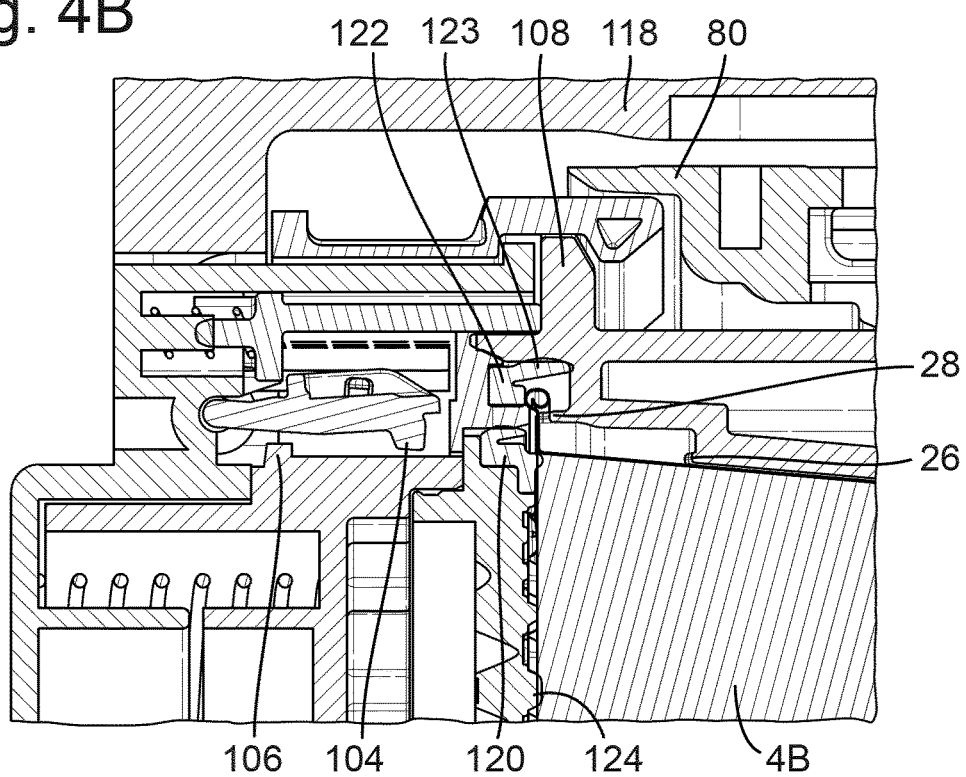

FIGS. 4A and 4B show functioning of the locking mechanism 86 when the cavity 24 holds the second capsule 4B. In this example, an outermost part of the second capsule 4B, here formed by the lid 12B, exit area 13B and/or rim 14B, is positioned forwardly, i.e. more towards the second brew chamber part 20, relative to the actuator 98. As a result, when advancing the second capsule 4B towards the second brew chamber part 20, the outermost part of the second capsule 4B will abut against the central portion 32 before the actuator 98 will touch the pusher 92. The central portion 32 is pushed against the biasing force of the resilient member 84 while the locker 88 is still pivoted away from the shaft 32'. As a result, the part 106 passed underneath the thumb 104. Only after the part 106 has passed the thumb 104 the pusher is pushed against the biasing force of the resilient member 96 by the actuator 98. The lip 100 of the pusher 92 will still slide along the sloping surface 102 of the locker 88, causing the locker 88 to pivot towards the shaft 32'. However, the part 106 has already passed the thumb 104 at that moment. In this example, the second capsule 4B pushes the central portion 32 in abutment with the body 94. This is herein defined as the second brewing position. Hence, the second capsule 4B is arranged for moving the central portion 32 from the ready position to the second brewing position. The second capsule 4B is held between the first and second brew chamber parts 18, 20 while brewing, wherein the central portion 32 is in the second brewing position.

Thus, the locking mechanism 86 is arranged for locking the central portion 32 in the first extraction position when the cavity 24 holds the first capsule 4A. It is noted that the locking may be single-sided, viz. the locking mechanism may prevent the central portion 32 from being moved beyond the first extraction position when the cavity 24 holds the first capsule 4A. However movement of the central portion 32 from the first extraction position to the ready position may be not prevented. The locking unit 86 is arranged for selectively preventing the central portion 32 being locked in or near the first brewing position when the second capsule 4B is included in the brew chamber. The locking unit 86 is arranged for selectively allowing the central portion 32 being moved into the second brewing position when the second capsule is included in the brew chamber.

When comparing FIGS. 3A and 4A it will be appreciated that while advancing the first brew chamber part 18 towards the second brew chamber part 20 the first capsule 4A is recessed further into the first brew chamber part than the second capsule 4B. Then the first lid 12A, exit area 13A and/or rim 14B is recessed further into the first brew chamber part 18 than the second lid 12B, exit area 13B and/or rim 14B.

When comparing FIGS. 3B and 4B it will be appreciated that when the brew chamber holds the first capsule 4A, the central portion 32 extends into the cavity 24. The central portion 32 extends into the first brew chamber part 18 beyond a position where the lid 12B, exit area 13B and/or rim 14B of the second capsule 4B would have been, had the second capsule been included in the first brew chamber part 18.

Figure 5A:
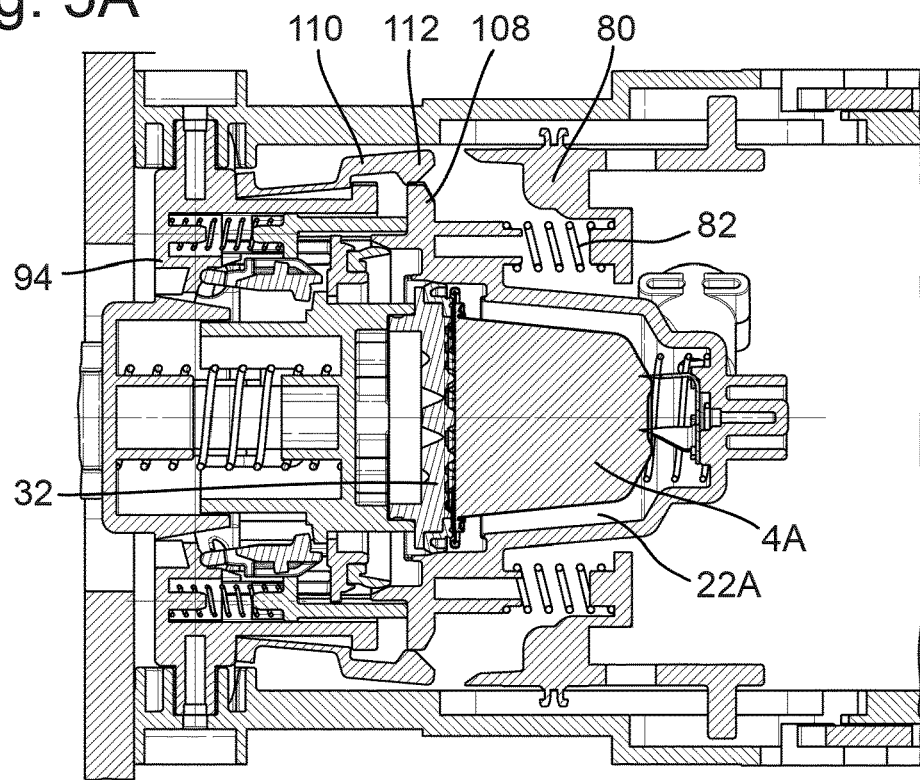
Figure 5B:
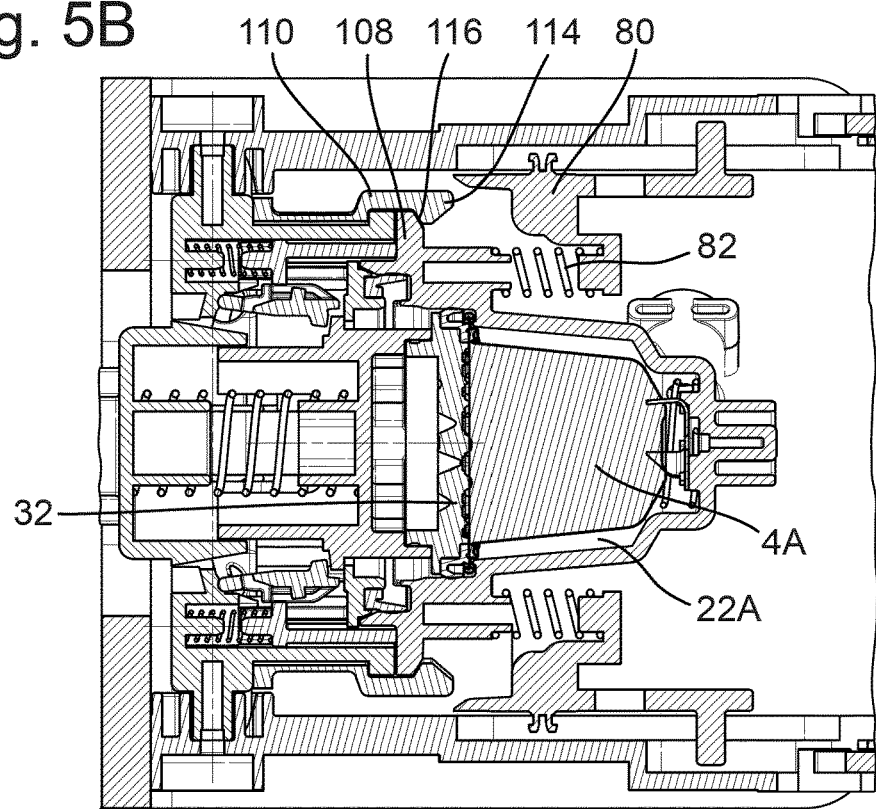
Figure 5C:
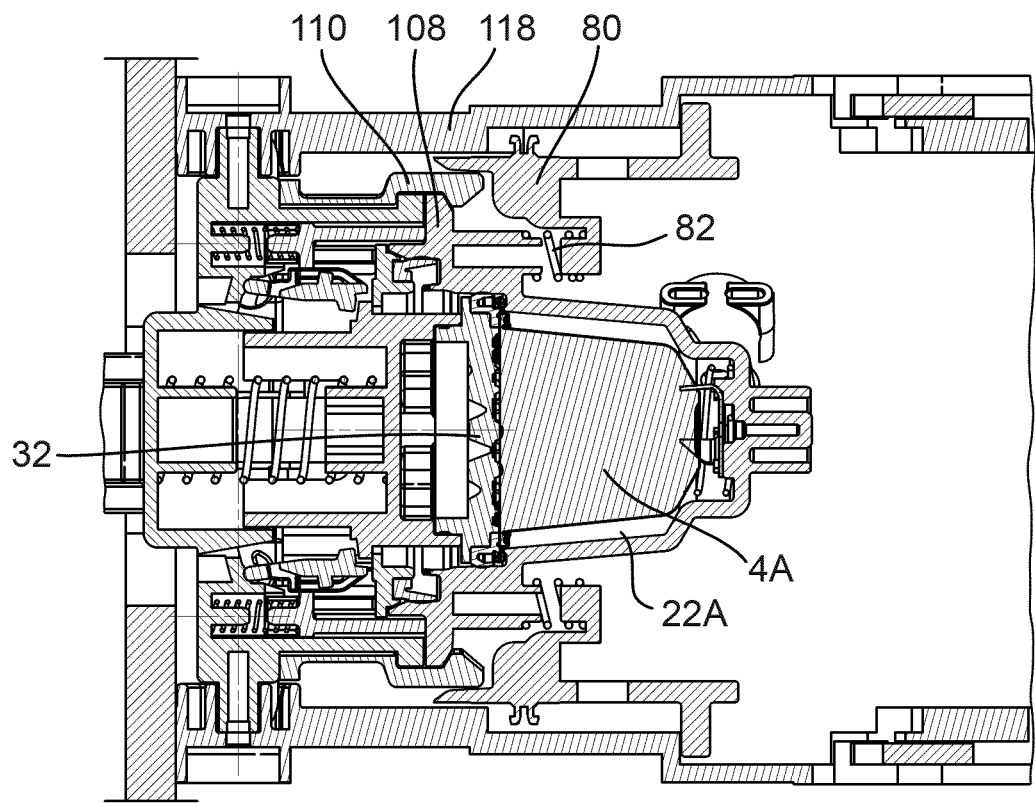

As mentioned above, the knee joint 62 is indirectly connected to the first brew chamber part 18, viz. via the arresting ring 80 and one or more resilient elements 82. FIGS. 5A-5C demonstrate functioning of the arresting ring 80.

In FIG. 5A the first capsule 4A abuts against the central portion 32 with the central portion in the first brewing position. The arresting ring 80 is still in the rearward position. It will be appreciated that the lever 58 will not yet have reached its end position. The first brew chamber part 18 includes a protrusion 108. Here the protrusion 108 is a substantially annular protrusion. The protrusion 108 extends outwardly. Here the protrusion 108 forms an outermost edge of the first brew chamber part 18. The second brew chamber part 20 includes a retainer 110. Here the retainer 110 is designed as a circumferential ring of retainer lips. The retainer 110 is pivotally connected to the body 94. Here the retainer 110 is resiliently pivotally connected to the body 94.

The retainer 110 includes a tooth 112. The tooth here has a first inclined surface 114 and a second inclined surface 116.

When lowering the lever 58, the arresting ring 80 will be advanced towards the second brew chamber part 20. The one or more resilient elements 82 will push the first brew chamber part 18 ahead of the arresting ring 80 until the first brew chamber part abuts against the second brew chamber 20 part, e.g. with the capsule 4A, 4B clamped in between. During this movement, the protrusion 108 will advance against the first inclined surface 114. This causes the retainer 110 to be pivoted outwardly (see FIG. 5A). Further advancing causes the protrusion 108 to pass beyond the second inclined surface 116, causing the retainer 110 to pivot inwardly (see FIG. 5B). Further lowering of the lever 58 first brew chamber part abuts against the second brew chamber 20 part will cause the one or more resilient elements 82 to be compressed. As a result, the arresting ring 80 will advance towards the second brew chamber part 20. Fully lowering the lever 58 will cause the arresting ring 80 to be interposed between the retainer 110 and a locking ring 118 (see FIG. 5C). The arresting ring 80 surrounding the retainer 110 prevents the retainer 110 from pivoting outwardly. Hence, the first brew chamber part is locked with respect to the second brew chamber part 20. The first brew chamber part is locked onto the second brew chamber part 20.

The apparatus can include a fluid supply system for supplying a fluid, e.g. a liquid, such as hot water under pressure, to the first brew chamber part 18. When the brew chamber is pressurized with the fluid for brewing a beverage, the first and second brew chamber parts 18, 20 will be pushed away from each other by the fluid pressure. The retainer 110 and arresting ring 80, and optionally the locking ring 118, will bear all, or part of, the force exerted by the fluid pressure. The arresting ring 80 interposed between the retainer 110 and the locking ring 118 increases mechanical stability. The arresting ring 80 does not have to bear all forces exerted onto it by the retainer 110, since it can abut against the locking ring 118 and transmit at least part of the forces to the locking ring 118. The locking ring 118 can be immobile, and hence can easily be reinforced. Since the first brew chamber part is locked onto the second brew chamber part 20 the frame 48 and the actuation mechanism, e.g. the knee joint, do not have to bear this force, or at least a smaller part thereof. Hence the frame and/or the actuation mechanism can be designed weaker and/or cheaper.

Although the functioning of the arresting ring 80 has been shown in FIGS. 5A-5C with respect to the first capsule 4A, it will be appreciated that the arresting ring 80 can function identically with respect to the second capsule 4B. FIG. 6A shows the first capsule 4A in the brew chamber during extraction. FIG. 6B shows the second capsule 4B in the brew chamber during extraction.

The piercing member 44 is arranged for piercing the bottom 8A, 8B of the capsule 4A, 4B. As can also be seen in FIGS. 5A-5C, in this example the piercing member 44 does not pierce the bottom 8A, 8B until the lid 12A, 12B of the capsule 4A, 4B abuts against the central portion 32 in the first or second brewing position. Thereto, stiffnesses of the resilient element 42 and the resilient member 84 can be chosen. In this example, the stiffness of the resilient element 42 is chosen to be larger than the stiffness of the resilient member 84. However, it will be appreciated that it is also possible that the stiffness of the resilient element 42 is equal to the stiffness of the resilient member 84 or that the stiffness of the resilient element 42 is smaller than the stiffness of the resilient member 84.

Once the capsule 4A, 4B is included in the brew chamber, and the bottom 8A, 8B has been pierced, a fluid, in this example hot water under pressure, can be supplied to the brew chamber. Therefore it is desired that the brew chamber is leak tight. Thereto the central portion 32 is provided with a first sealing member 120. The peripheral portion 34 is provided with a second sealing member 122. The beverage preparation apparatus 2 is arranged for preparing a quantity of a beverage, suitable for consumption, using either a first capsule 4A or a second capsule 4B. The quantity can be a predetermined quantity. The quantity can also be a user selectable, user settable, or user programmable quantity.

Referring to FIG. 3B sealing in view of the first capsule 4A is described. The first sealing member 120 is arranged for providing a fluid sealing engagement between the central portion 32 and the first brew chamber 18 part when forming the brew chamber for holding the first capsule 4A. In this example, the first sealing member 120 abuts against the first brew chamber part 18 when the first capsule 4A is included in the brew chamber. This provides a seal for water being present in the cavity 24 outside the capsule 4A. This way, brewing fluid injected into the brew chamber 22A is prevented from bypassing around the outside of the capsule 4A. In the example of FIG. 3B the first sealing member 120 includes a resilient lip 121. The resilient lip 121 is arranged to provide a self-reinforcing sealing engagement between the central portion 32 and the first brew chamber part 18 under the effect of fluid pressure in the brew chamber. In this example the first sealing member 120 abuts against the rim 14A of the first capsule 4A. The rim 14A is pressed against the first sealing member 120 by the first abutment surface 26. This provides a sealing engagement between the central portion 32 and the capsule 4A against beverage exiting the capsule 4A via the exit area 13A. It will be appreciated that here the side of the rim 14A facing away from the cup-shaped body 6A is sealed against the second brew chamber part 20. Alternatively, or additionally, the side of the rim 14A facing towards the cup-shaped body 6A can be sealed against the first brew chamber part 18. Thereto an additional seal can be provided on the first brew chamber part 18, e.g. on the first abutment surface 26, and/or on the capsule 4A, e.g. on the rim 14A. It will be clear that a seal on the capsule may be additional to the seal between the first brew chamber part 18 and the second brew chamber part 20. This may reduce the sealing effort by the first sealing member 120.

Referring to FIG. 4B sealing in view of the second capsule 4B is described. The second sealing member 122 is arranged for providing a fluid sealing engagement between the peripheral portion 34 and the first brew chamber 18 part when forming the brew chamber for holding the second capsule 4B. In this example, the second sealing member 122 abuts against the first brew chamber part 18 when the second capsule 4B is included in the brew chamber. This provides a seal for water being present in the cavity 24 outside the capsule 4B. In the example of FIG. 4B the second sealing member 122 includes a resilient lip 123. The resilient lip 123 is arranged to provide a self-reinforcing sealing engagement between the peripheral portion 34 and the first brew chamber part 18 under the effect of fluid pressure in the brew chamber. In this example the second sealing member 122 abuts against the rim 14B of the second capsule 4B. The rim 14B is pressed against the second sealing member 122 by the second abutment surface 28. This may provide a sealing engagement between the peripheral portion 34 and the capsule 4B against beverage exiting the capsule 4B via the exit area 13B. In FIG. 4B the first sealing member 120 provides a sealing engagement between the central portion 32 and the peripheral portion 34 when forming the brew chamber for holding the second capsule 4B. This sealing engagement between the central portion 32 and the peripheral portion 34 can be self-reinforcing. Thereto the engagement between peripheral portion 34 and the second capsule 4B may allow brewing fluid to pass to the first sealing member 120. Hence, the first sealing member 120 provides a sealing engagement between the central portion 32 and the capsule 4B against beverage exiting the capsule 4B via the exit area 13B. It will be appreciated that here the side of the rim 14B facing away from the cup-shaped body 6B, which rim may or may not be covered by a lid, for example by a foil, is sealed against the second brew chamber part 20. Alternatively, or additionally, the side of the rim 14B facing towards the cup-shaped body 6B can be sealed against the first brew chamber part 18. Thereto an additional seal can be provided on the first brew chamber part 18, e.g. on the second abutment surface 28, and/or on the capsule 4B, e.g. on the rim 14B. It will be clear that a seal on the capsule may be additional to the seal between the first brew chamber part 18 and the second brew chamber part 20. This may reduce the sealing effort by the second sealing member 122.

When the fluid under pressure is supplied to the capsule 4A, 4B in the brew chamber, the exit area 13A, 13B may open against the extraction plate 30. The extraction plate 30 in this example includes a plurality of relief elements 124. Here the relief elements 124 are truncated pyramids. A rise in pressure inside the capsule 4A, 4B can cause the exit area 13A, 13B to tear against the relief elements allowing beverage to exit the capsule 4A, 4B.

The beverage can pass through the extraction plate 30 via apertures in the extraction plate. Next the beverage can flow to an outlet 126. From the outlet 126 the beverage can flow into a receptacle, such as a cup.

Figure 7A:
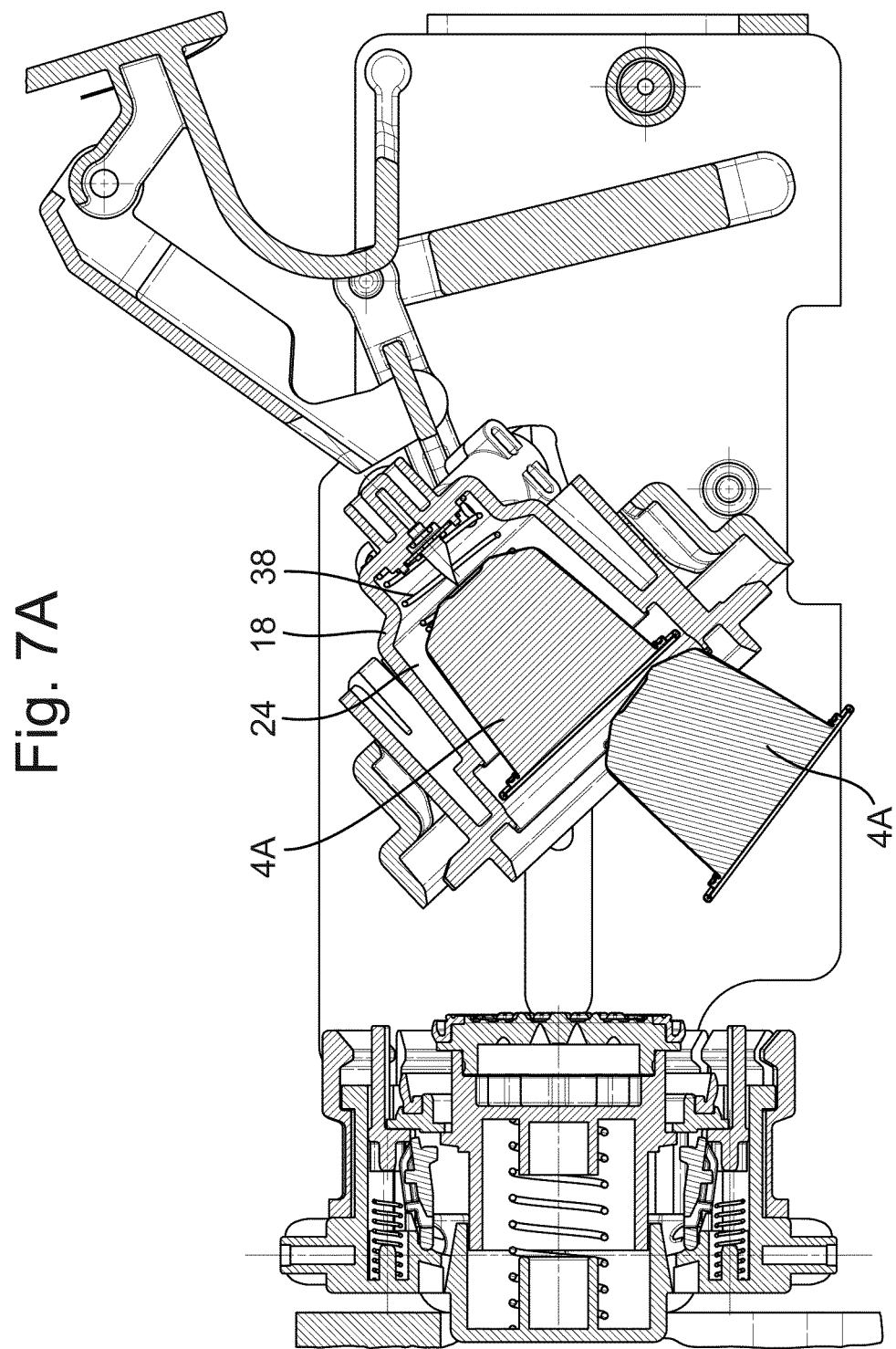
Figure 7B:
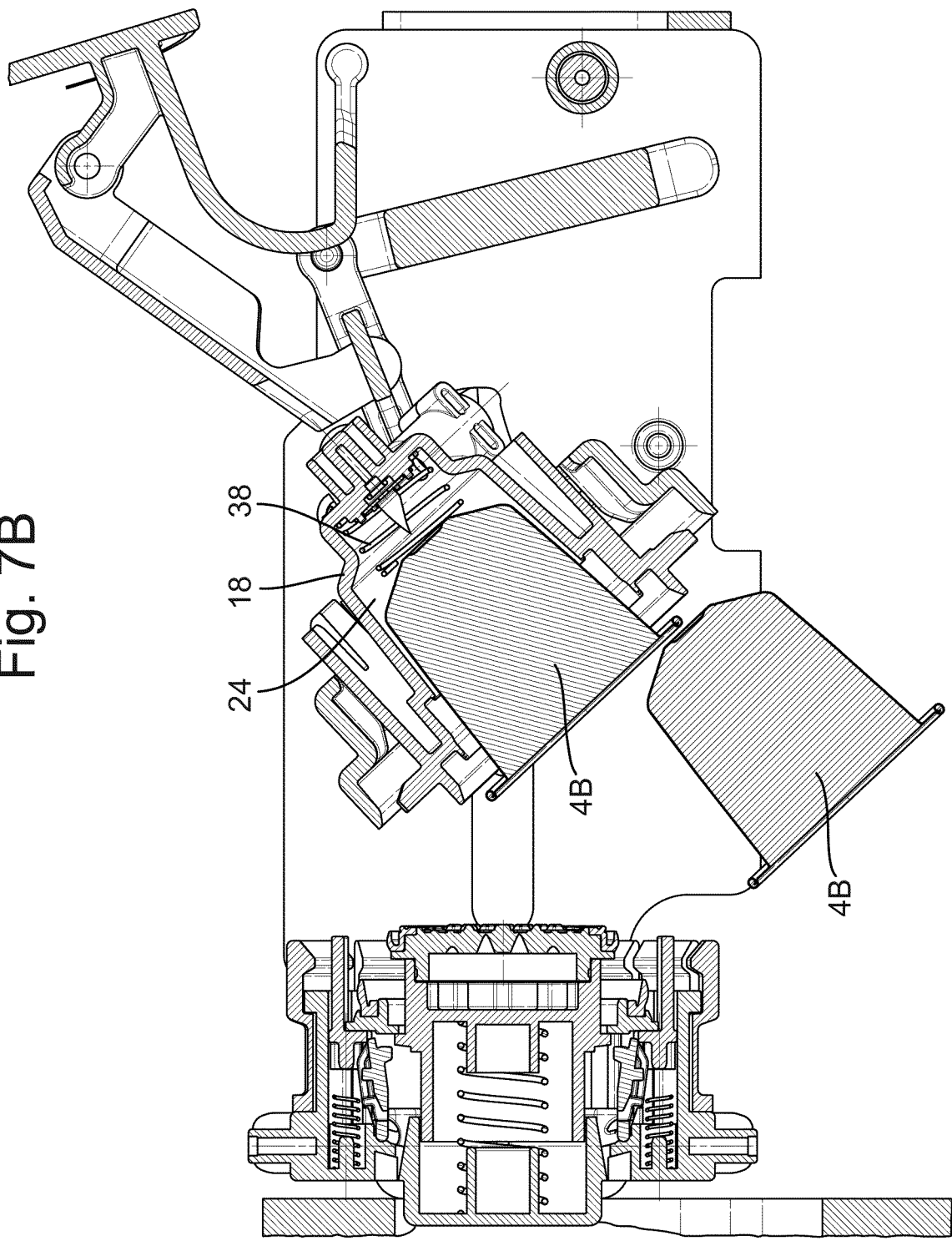

Once the beverage has been brewed, the lever 58 can be moved upwardly. This causes the arresting ring 80 to be moved away from the retainer 110. Next, the first brew chamber part 18 will be moved rearwardly. The second inclined surface 116 of the retainer 110 can allow the retainer to pass the projection 108. The first brew chamber 18 part will move away from the second brew chamber part 20. The central portion 32 will return to the ready position. The bosses 50, 52 and grooves 54, 56 determine the path that will be followed by the first brew chamber part 18. As shown in FIGS. 7A and 7B the first brew chamber part will swivel downwardly. This promotes ejection of the used capsule 4A, 4B from the cavity 24 under the effect of gravity. The ejector 38 can assist in pushing the capsule 4A, 4B off the piercing member 44 and out of the cavity 24. The used capsule 4A, 4B can fall into a waste basket of the apparatus 2.

Figure 8A:
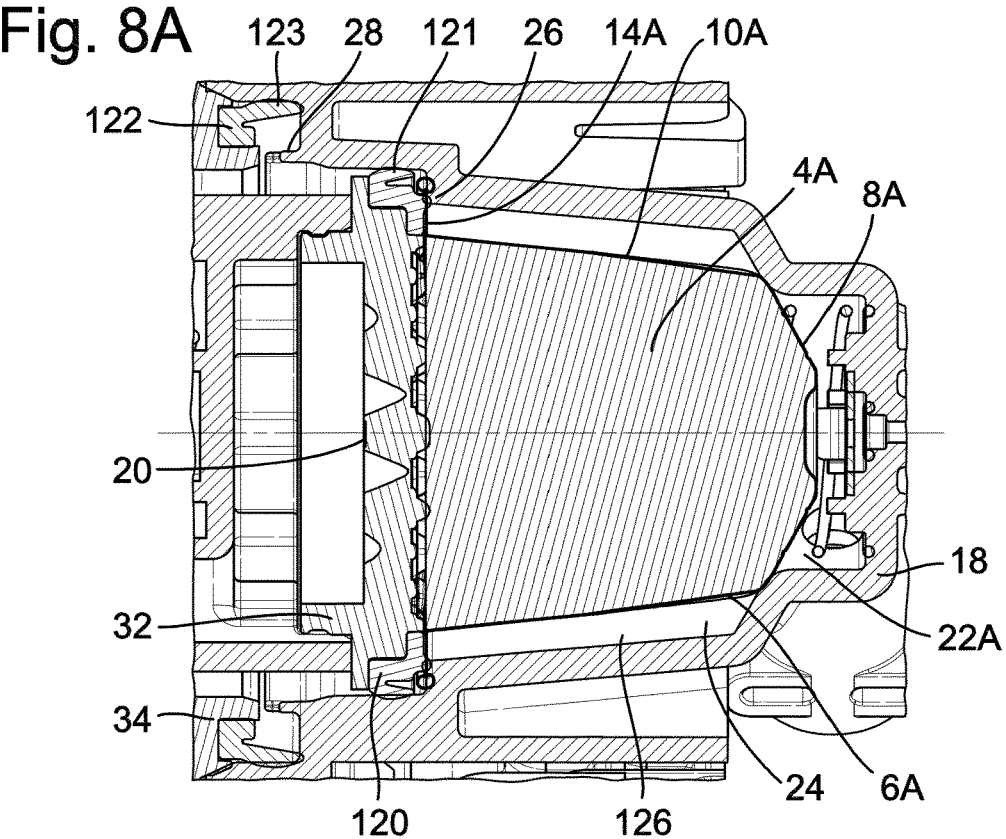
Figure 8B:
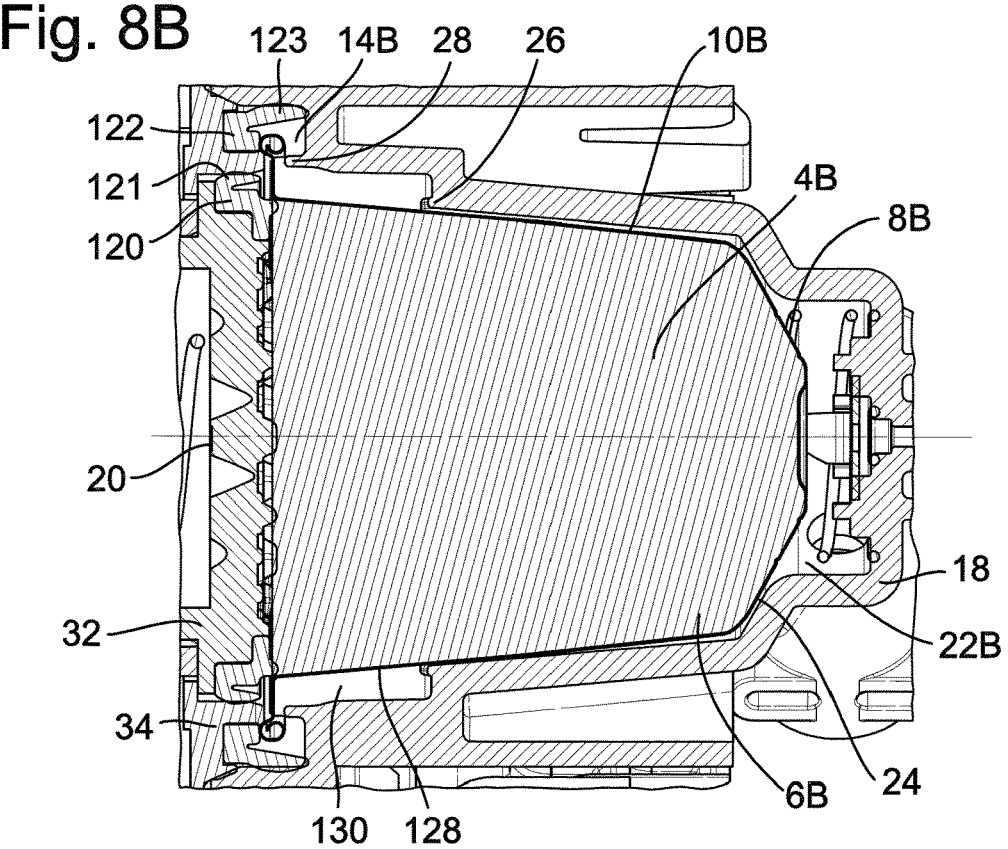

In this example the first and second capsules 4A, 4B are designed to make a similar visual impression. FIG. 8A shows an example of a first capsule 4A inserted in the brew chamber 22A formed by the first brew chamber part 18 and the second brew chamber part 20. It will be appreciated that the circumferential wall 10A is narrower than the cavity 24 at that location. As a result there is a first volume 126 surrounding the first capsule 4A inside the cavity 24. FIG. 8B shows an example of a second capsule 4B inserted in the brew chamber 22B formed by the first brew chamber part 18 and the second brew chamber part 20. It will be appreciated that a part 128 of the circumferential wall 10B is narrower than the cavity 24 at that location. This part 128 is formed by the part of the circumferential wall 10B extending beyond the first abutment surface 26. As a result there is a second volume 130 surrounding the second capsule 4B inside the cavity 24.

It is noted that the first volume 126 is not occupied by the first capsule 4A when the brew chamber holds the first capsule 4A. However, this first volume 126 is occupied by part of the second capsule 4B when the brew chamber holds the second capsule 4B. The second volume 130 is not occupied by the second capsule 4B when the brew chamber holds the second capsule 4B. This second volume 130 receiving the central portion 32 of the extraction plate 30 when the brew chamber holds the first capsule 4A.

When brewing a beverage using the first capsule 4A, the first volume 126 will fill with fluid, such as water, which fluid is not used for brewing the beverage. This fluid can be drained to the waste basket after brewing. When brewing a beverage using the second capsule 4B, the second volume 130 will fill with fluid, such as water, which fluid is not used for brewing the beverage. This fluid can be drained to a container, e.g. the waste basket, after brewing. In this example the first volume 126 is substantially equal to the second volume 130. Hence, the volume of fluid directed to the waste basket is substantially equal when brewing a beverage using a first capsule 4A and when brewing a beverage using a second capsule 4B.

Herein, the invention is described with reference to specific examples of embodiments of the invention. It will, however, be evident that various modifications and changes may be made therein, without departing from the essence of the invention. For the purpose of clarity and a concise description features are described herein as part of the same or separate embodiments, however, alternative embodiments having combinations of all or some of the features described in these separate embodiments are also envisaged.

In the examples, the central portion of the extraction plate includes a plurality of relief elements. The peripheral portion includes no relief elements. However, it will be appreciated that the peripheral portion may also include relief elements. The extraction plate and the second exit area can be adapted to each other such that a flow resistance of the second exit area when opened is less than a flow resistance of the first exit area when opened. The extraction plate and the second exit area may be adapted to each other such that the second exit area tears on the extraction plate over a larger surface area than the first exit area. The extraction plate and the second exit area may be adapted to each other such that the second exit area tears on the extraction plate on more locations than the first exit area. Outer relief elements may be designed for tearing both the first and second exit area wherein the second exit area tears on the outer relief elements over a larger surface area than the first exit area. The extraction plate can include relief elements of a first type and at least one relief element of a second type, wherein the relief elements of the first type are arranged within an area corresponding to the first exit area, and the at least one relief element of the second type being arranged within an area corresponding to the second exit area and outside the area corresponding to the first exit area. The relief element of the second type may have a sharper edge than the relief elements of the first type. The second exit area may include a weakened zone. The weakened zone may be located in a peripheral area of the second exit area.

In the examples, the first and second capsules have substantially the same shape. It is also possible to provide a third capsule having a different shape. The third capsule can e.g. be shaped to substantially fill the brew chamber when the central portion is in the first extraction position. It is also possible to provide a fourth capsule having a different shape.

The fourth capsule can e.g. be shaped to substantially fill the brew chamber when the central portion is in the second extraction position.

In the examples, the first capsule has an outwardly extending flange-like rim. It will be appreciated that it is possible that the first capsule does not include an outwardly extending rim. In the examples, the second capsule has an outwardly extending flange-like rim. It will be appreciated that it is possible that the second capsule does not include an outwardly extending rim.

In the examples, the capsule body and lid are made of aluminium foil, preferable polymer coated aluminium foil to allow easy welding of the lid to the body. It will be appreciated that the capsule body and/or lid can be made of a wide variety of materials considered suitable by the skilled person and capable of being processed into a sheet, film or foil using techniques conventionally known in the art such as extrusion, co-extrusion, injection molding, blow molding, vacuum forming etc. Suitable materials for the capsule body and/or lid include, without being limited thereto, plastic materials, in particular thermoplastic materials, for example a polyolefin polymer, for example polyethylene or polypropylene, PVC, polyesters for example polyethylene terephthalate (PET); metal foils such as aluminum, stainless steel, metal alloys etc.; or sheets of a woven or a non-woven or otherwise processed fibrous material, like paper, polyester, etc.; or combinations thereof, e.g. multilayers. The material for the capsule can be a biodegradable polymer or another biodegradable material. The skilled person will be capable of selecting the appropriate material taking into account the envisaged use with food material and any other relevant circumstances during use of the capsule. The thickness of the sheet or foil may be chosen such that a form stable capsule is provided. The thickness of the sheet or foil may vary with the nature of the material.

In the examples, the capsules are closed capsules. It is also possible to provide the system with an open capsule. The open capsule is open prior to insertion into the apparatus. The open capsule can be pre-perforated. The open capsule can be packaged in a hermetically sealed package which has to be removed before inserting the open capsule in the apparatus. In the examples, the capsules are pierced by the piercing means. It is also possible to provide the system with a capsule that is not pierced by the piercing means. Such capsule can e.g. include an entrance filter. In the examples, the capsules open against the extraction plate. It is also possible to provide the system with a capsule that does not open against the extraction plate. Such capsule can e.g. include an exit filter.

In the examples, the capsules themselves do not include a sealing member. It will be appreciated that it is possible to provide the capsule with a sealing member, e.g. a resilient sealing member. The sealing member can e.g. be placed on the rim, e.g. on the side facing towards the cup-shaped body or on the side facing away from the cup-shaped body. Alternatively, or additionally, a sealing member can be provided on the circumferential wall and/or on the bottom.

In the examples the arresting ring and retainer extend along substantially the entire perimeter of the first and second brew chamber parts. This provides particular good locking of the two brew chamber parts onto each other. However, it will be appreciated that it is also possible that the arresting ring and retainer include arresting means and retaining means at one or more discrete positions along the perimeter, e.g. at two, three, four, six or eight positions.

It will be appreciated that it is also possible to provide a first apparatus arranged for brewing a beverage using a first capsule, but incapable of brewing a beverage using a second capsule. Such first apparatus can be included in a system with the apparatus as described in relation to the figures and a first capsule and optionally a second capsule.

It will be appreciated that it is also possible to provide a second apparatus arranged for brewing a beverage using a second capsule, but incapable of brewing a beverage using a first capsule. Such second apparatus can be included in a system with the apparatus as described in relation to the figures and a second capsule and optionally a first capsule.

However, other modifications, variations, and alternatives are also possible. The specifications, drawings and examples are, accordingly, to be regarded in an illustrative sense rather than in a restrictive sense.

For the purpose of clarity and a concise description features are described herein as part of the same or separate embodiments, however, it will be appreciated that the scope of the invention may include embodiments having combinations of all or some of the features described.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

What is claimed is:

1. A system for preparing a quantity of beverage suitable for consumption, the system comprising:
   a first exchangeable capsule and a second exchangeable capsule, the second exchangeable capsule being larger than the first exchangeable capsule, and
   an apparatus including a first brew chamber part and a second brew chamber part forming a brew chamber for closing around one of the first exchangeable capsule and the second exchangeable capsule while preparing the quantity of the beverage, and
   a fluid dispensing device for supplying an amount of fluid under pressure to the first brew chamber part,
   wherein the first brew chamber part includes a cavity for receiving the first or second exchangeable capsule,
   wherein an outer part of the second exchangeable capsule comprises a cup-shaped body, a lid and a flange, wherein the cup-shaped body comprises a bottom and an outer circumferential wall of the second exchangeable capsule,
   wherein the first brew chamber part and the second exchangeable capsule are adapted to each other such that the outer circumferential wall of the second exchangeable capsule engages at least a part of an inner circumferential wall of the first brew chamber part when loading the second exchangeable capsule into the first brew chamber part.

2. The system according to claim 1, wherein the outer part of the second exchangeable capsule comprises a protrusion.

3. The system according to claim 1, wherein the outer part of the second exchangeable capsule comprises a protrusion, and wherein the protrusion comprises at least two ribs extending from the outer circumferential wall of the second exchangeable capsule.

4. The system according to claim 2, wherein the protrusion comprises at least one annular protrusion.

5. The system according to claim 4, wherein the annular protrusion is continuous along the outer circumferential wall.

6. The system according to claim 1, wherein:
the part of the inner circumferential wall of the cavity that the second exchangeable capsule is arranged to engage with is an outer edge of the inner circumferential wall of the cavity; and
the flange comprising a thickened part at the outer edge of the flange.

7. The system according to claim 6, wherein the flange has a flange diameter larger than a diameter of the outer edge of the inner circumferential wall of the cavity.

8. The system according to claim 1, wherein the first brew chamber part and the second exchangeable capsule are adapted to each other such that the second exchangeable capsule centers in the cavity by means of the outer part.

9. The system according to claim 1, wherein the first brew chamber part includes a centering module at a bottom of the cavity, wherein the first exchangeable capsule and the second exchangeable capsule are arranged to cooperate with the centering module for centering the first exchangeable capsule and the second exchangeable capsule near the bottom of the cavity.

10. The system according to claim 9, the centering module further comprising a helical spring comprising a distal end projecting from the bottom of the cavity and the first and second exchangeable capsules are configured to be at least in part received by the distal end of the helical spring.

11. The system according to claim 1, wherein the first brew chamber part and the first exchangeable capsule are adapted to each other such that a flange of the first exchangeable capsule engages at least part of an inner circumferential wall of the first brew chamber part when loading the first exchangeable capsule into the first brewing chamber part.

12. The system according to claim 11, wherein the first brew chamber part and the first exchangeable capsule are adapted to each other such that the first exchangeable capsule centers in the cavity by means of the flange.

13. The system according to claim 1, wherein a diameter of the second exchangeable capsule is larger than a diameter of the first exchangeable capsule.

14. The system according to claim 1, wherein an axial length of the second exchangeable capsule is larger than an axial length of the first exchangeable capsule.

15. The system of claim 1, wherein the cavity of the first brew chamber part has an invariable shape for holding one of the first exchangeable capsule and the second exchangeable capsule.

16. The system of claim 1, wherein the inner circumferential wall of the first brew chamber part surrounds the outer circumferential wall of the second exchangeable capsule when the second exchangeable capsule is loaded into the first brew chamber part.

* * * * *

UNITED STATES PATENT AND TRADEMARK OFFICE
CERTIFICATE OF CORRECTION

PATENT NO. : 12,295,521 B2
APPLICATION NO. : 16/265950
DATED : May 13, 2025
INVENTOR(S) : Peter Rijskamp et al.

Page 1 of 1

It is certified that error appears in the above-identified patent and that said Letters Patent is hereby corrected as shown below:

On the Title Page

Item (72) Inventors: Change "Haaneke" to -- Hanneke --.

Signed and Sealed this
Nineteenth Day of August, 2025

Coke Morgan Stewart
*Acting Director of the United States Patent and Trademark Office*